(12) United States Patent
Teranishi et al.

(10) Patent No.: US 9,013,415 B2
(45) Date of Patent: Apr. 21, 2015

(54) INFORMATION INPUT DEVICE INCLUDING A DETECTION ELECTRODE WITH AN APERTURE

(75) Inventors: Yasuyuki Teranishi, Aichi (JP); Kouji Noguchi, Kanagawa (JP); Koji Ishizaki, Aichi (JP); Takayuki Nakanishi, Aichi (JP); Takeya Takeuchi, Aichi (JP)

(73) Assignee: Japan Display Inc., Tokyo (JP)

( * ) Notice: Subject to any disclaimer, the term of this patent is extended or adjusted under 35 U.S.C. 154(b) by 384 days.

(21) Appl. No.: 12/796,181

(22) Filed: Jun. 8, 2010

(65) Prior Publication Data

US 2010/0328268 A1   Dec. 30, 2010

(30) Foreign Application Priority Data

Jun. 29, 2009   (JP) ................. 2009-154072

(51) Int. Cl.
*G06F 3/041* (2006.01)
*G06F 3/044* (2006.01)
*G02F 1/1333* (2006.01)

(52) U.S. Cl.
CPC ............ *G06F 3/044* (2013.01); *G02F 1/13338* (2013.01); *G06F 3/0412* (2013.01); *G06F 3/0416* (2013.01)

(58) Field of Classification Search
USPC ........................................................ 345/173
See application file for complete search history.

(56) References Cited

U.S. PATENT DOCUMENTS

| | | |
|---|---|---|
| 5,283,556 A | 2/1994 | Ise |
| 5,418,551 A | 5/1995 | Ise |
| 5,528,267 A | 6/1996 | Ise |
| 5,844,506 A | 12/1998 | Binstead |
| 6,137,427 A | 10/2000 | Binstead |
| 2004/0003949 A1 | 1/2004 | Lin |
| 2006/0044497 A1* | 3/2006 | Kurasawa ............ 349/114 |
| 2007/0062739 A1 | 3/2007 | Philipp et al. |
| 2008/0129317 A1* | 6/2008 | Oba ...................... 324/663 |
| 2008/0158777 A1 | 7/2008 | Sohn et al. |

(Continued)

FOREIGN PATENT DOCUMENTS

| | | |
|---|---|---|
| CN | 101211693 A | 7/2008 |
| GB | 2 435 998 A | 9/2007 |

(Continued)

OTHER PUBLICATIONS

Official Action issued on Oct. 30, 2012 by the Japanese Patent Office in corresponding Japanese Patent Application No. 2009-154072.

(Continued)

*Primary Examiner* — Long D Pham
(74) *Attorney, Agent, or Firm* — Dentons US LLP

(57) ABSTRACT

An information input device includes a touch panel which is provided with a touch sensor capable of sensing a position in which a sensing target body is close to a sensing surface thereof. The touch sensor includes a scanning electrode and a detection electrode which faces and is spaced from the scanning electrode with a dielectric body being interposed therebetween, the touch sensor being configured so that electrostatic capacitance which is formed between the scanning electrode and the detection electrode is varied when the sensing target body is close to the detection electrode. The detection electrode is formed with a slit in a surface thereof which faces the scanning electrode, and a floating electrode is installed in the slit.

15 Claims, 30 Drawing Sheets

(56) References Cited

U.S. PATENT DOCUMENTS

| | | |
|---|---|---|
| 2008/0211395 A1 | 9/2008 | Koshihara et al. |
| 2009/0141002 A1* | 6/2009 | Sohn et al. .................... 345/175 |
| 2009/0213090 A1 | 8/2009 | Mamba et al. |
| 2009/0272122 A1 | 11/2009 | Shi et al. |
| 2009/0284492 A1* | 11/2009 | Chino .......................... 345/174 |
| 2010/0104433 A1 | 4/2010 | Shi et al. |
| 2010/0170264 A1 | 7/2010 | Shi et al. |
| 2011/0199333 A1 | 8/2011 | Philipp et al. |
| 2012/0070276 A1 | 3/2012 | Shi et al. |
| 2013/0094946 A1 | 4/2013 | Shi et al. |

FOREIGN PATENT DOCUMENTS

| | | |
|---|---|---|
| JP | H2-255911 | 10/1990 |
| JP | 9-120334 A | 5/1997 |
| JP | H9-511086 | 11/1997 |
| JP | 2004-38919 A | 2/2004 |
| JP | 2008-009759 | 1/2008 |
| JP | 2008-45538 | 2/2008 |
| JP | 2008-129708 | 6/2008 |
| JP | 2008-216543 A | 9/2008 |
| JP | 2009-003916 | 1/2009 |
| JP | 2009-205321 A | 9/2009 |

OTHER PUBLICATIONS

Japanese Office Action issued in connection with related Japanese Patent application No. 2009-154072 dated Aug. 20, 2013.

Chinese Office Action issued in connection with related Chinese Patent Application No. 201010205829.7 dated Sep. 16, 2013.

* cited by examiner

FIG. 2
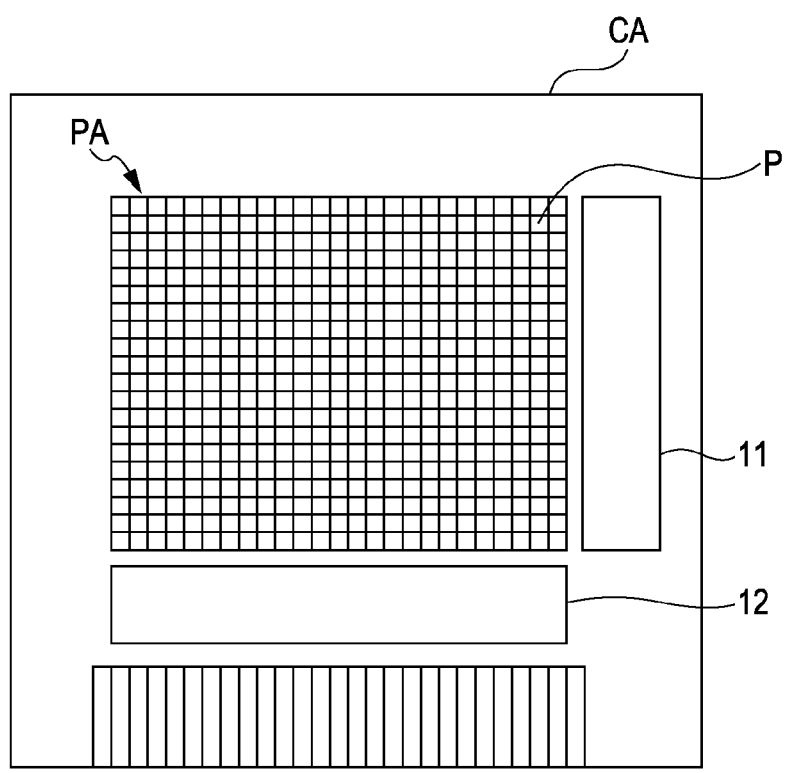
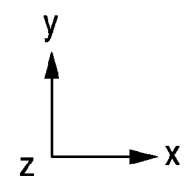

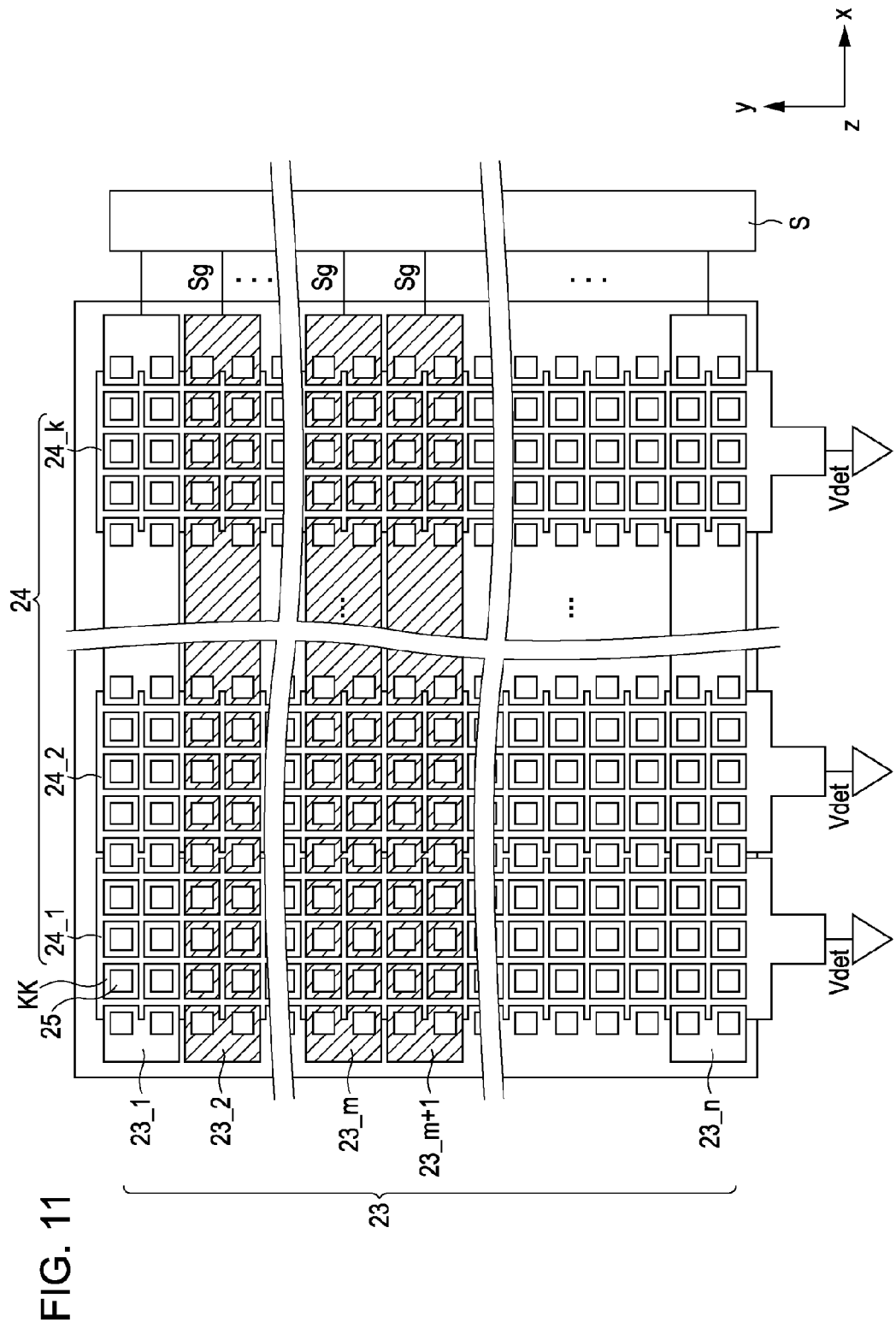

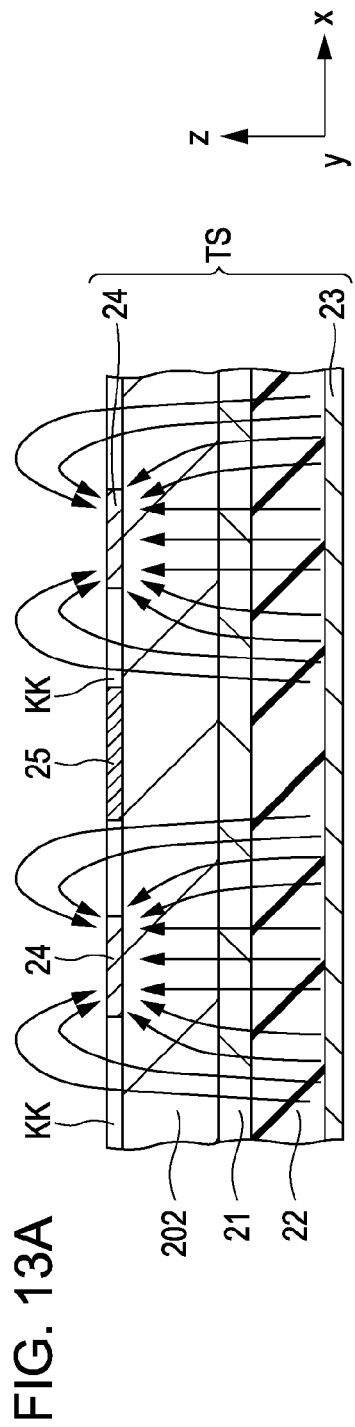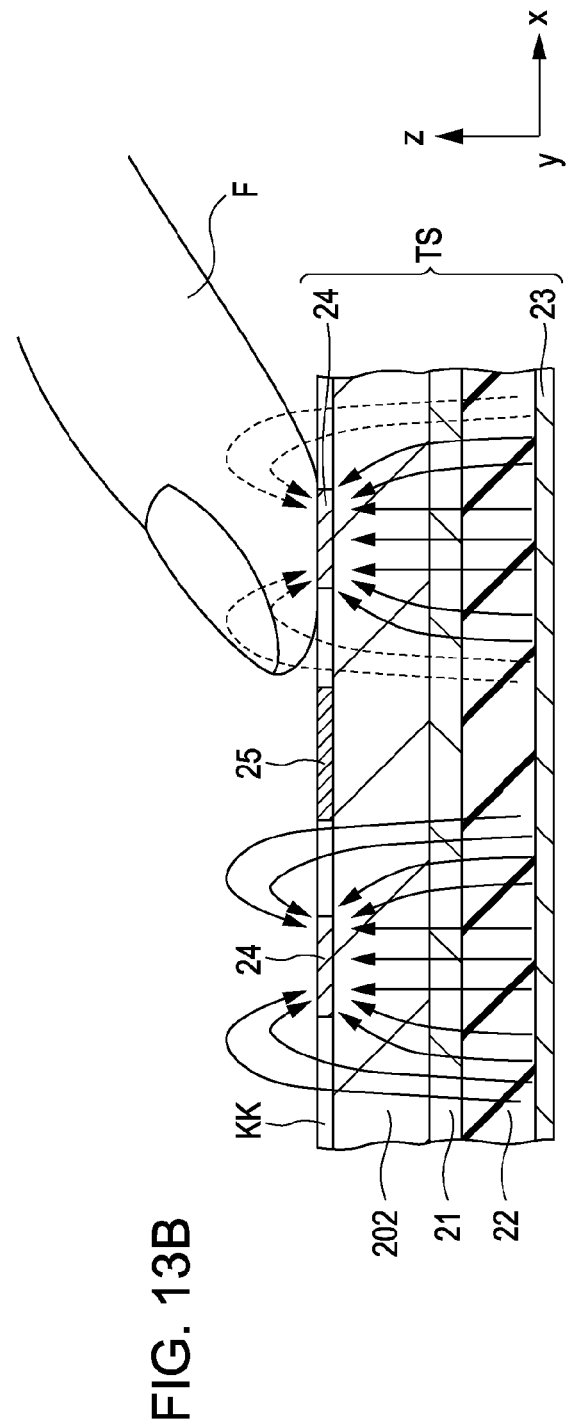

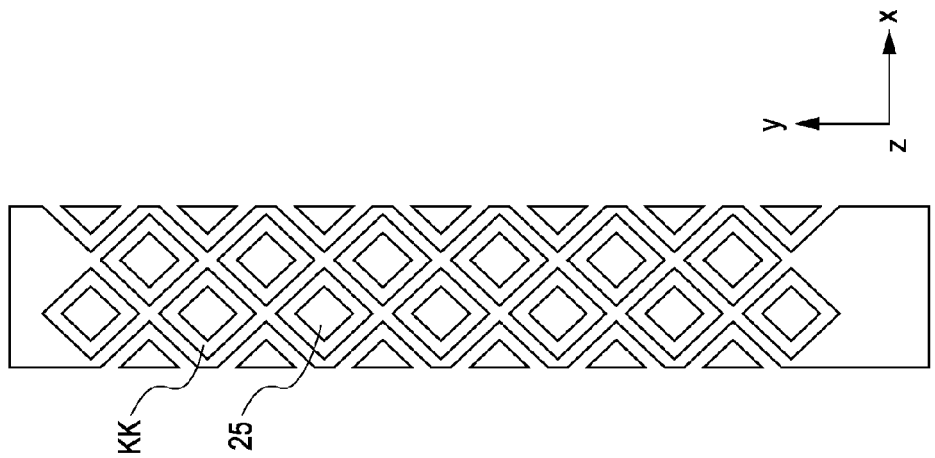
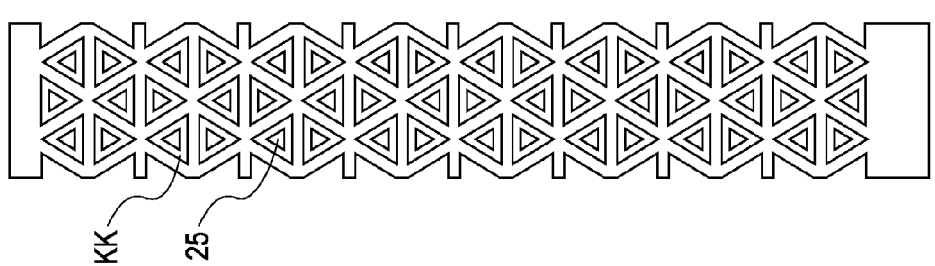
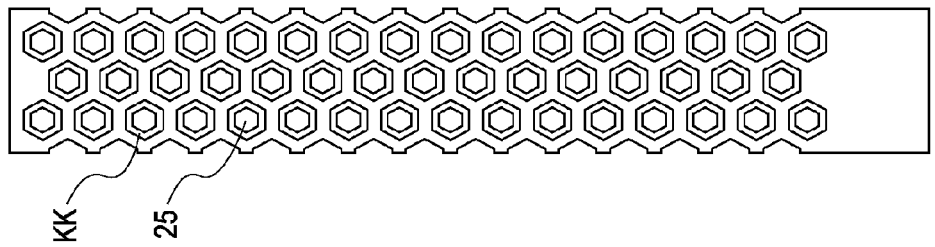
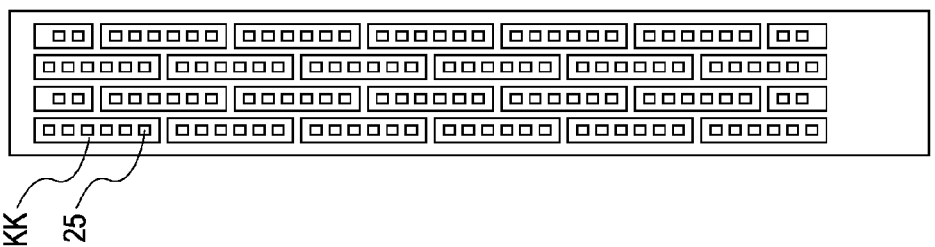

INFORMATION INPUT DEVICE INCLUDING A DETECTION ELECTRODE WITH AN APERTURE

BACKGROUND OF THE INVENTION

1. Field of the Invention

The present invention relates to an information input device and a display device, and more particularly, to an information input device and a display device which include a panel which is provided with an electrostatic capacitance touch sensor for sensing a close position of a sensing target body.

2. Description of the Related Art

A display device such as a liquid crystal display device or an organic EL device has advantages of a thin and lightweight configuration and low power consumption. Thus, the display device is widely used in mobile electronic devices such as cellular phones or digital cameras.

In such a display device, the liquid crystal display device is provided with a liquid crystal display panel in which a liquid crystal layer is inserted between a pair of substrates, as a display panel. For example, the liquid crystal display panel is a transmission type. Here, the liquid crystal display panel modulates and transmits illuminating light emitted from a backlight which is installed on a rear surface of the liquid crystal display panel. Then, display of images is performed on a front surface of the liquid crystal display panel by the modulated illuminating light.

The liquid crystal display device is, for example, an active matrix type. Here, the liquid crystal display device includes a TFT array substrate which is formed with a plurality of thin film transistors (TFTs) which serves as pixel switching elements. In the liquid crystal display panel, an opposite substrate is arranged to be opposite to the TFT array substrate, and the liquid crystal layer is disposed between the TFT array substrate and the opposite substrate. In this liquid crystal display panel of the active matrix type, as the pixel switching elements input an electric potential to pixel electrodes, voltage is applied to the liquid crystal layer, and the image display is performed by controlling the transmittance of the light which passes through the pixels.

In the above described display device, a touch panel may be provided on the display panel as an information input device so that a user can input manipulation data using images such as icons which are displayed on a screen of the display panel.

In this respect, the touch panel may be externally provided on the display panel, or the function of the touch panel may be installed in the display panel.

For example, there has been proposed a display panel in which an electrostatic capacitance touch sensor is installed (for example, refer to Japanese Unexamined Patent Application Nos. 2008-9750, 2009-3916 and 2008-129708).

Here, the electrostatic capacitance touch sensor is configured so that capacitance can be varied when a sensing target body is close to a sensing surface. A position in which the sensing target body is close to the sensing surface is detected on the basis of the variation of the capacitance.

SUMMARY OF THE INVENTION

FIG. 33 is a diagram illustrating a state at the time when an electrostatic capacitance touch sensor TS is driven, in which FIG. 33A illustrates a case where a sensing target body F is close to a sensing surface of the touch sensor TS; and FIG. 33B illustrates a case where the sensing target body F is not close to the sensing surface.

As shown in FIGS. 33A and 33B, for example, the electrostatic capacitance touch sensor TS has a configuration that a pair of electrodes of a scanning electrode 23J and a detection electrode 24J are opposite to each other with a dielectric body Y being disposed therebetween to form an electrostatic capacitance element.

In the case where the sensing target body F is not close to the sensing surface, when a common electric potential Vcom is applied to the scanning electrode 23J which is a driving electrode, as shown in FIG. 33A, an electric field is generated between the scanning electrode 23J and the detection electrode 24J.

On the other hand, in the case where the sensing target body F such as a finger having large capacitance is close to the sensing surface, as shown in FIG. 33B, a fringe electric field (dotted lines in the figure) is cut off due to the sensing target body F.

Thus, capacitance between the scanning electrode 23J and the detection electrode 24J is varied according the presence or absence of the sensing target body F. On the basis of the variation of the capacitance, a position in which the sensing target body F is close to the sensing surface is detected.

In the above described electrostatic capacitance touch sensor, the sensitivity of the detection may be not sufficiently high, and the detection of the touch position may not be performed with high accuracy. In consideration of this problem, as disclosed in Japanese Unexamined Patent Application No. 2008-129708, a configuration that a dummy electrode is installed in addition to the electrodes such as a detection electrode has been proposed.

When the capacitance due to the scanning electrode and the detection electrode with respect to a parasitic capacitance of the detector is remarkably decreased, since there is a case where the detection is not preferably performed, it is necessary to increase the width of the detection electrode 24J. However, in this case, since the fringe electric field is cut off by the thick detection electrode 24J, the detection sensitivity may be deteriorated.

Further, in a case where the detection electrode 24J is formed as a transparent electrode such as ITO (Indium Tin Oxide), since a specific resistance of the detection electrode becomes increased in order to secure a higher transparency, a time constant is increased. Thus, a detection time may be increased.

In this way, in the touch sensor, since the detection sensitivity may not be sufficient and the detection time may be increased, there is a case where it is difficult to perform the detection with high accuracy.

Further, even in the case where the detection electrode 24J is formed as the transparent electrode, the detection electrode 24J may be visualized in the sensing surface. Thus, the quality of images displayed on the sensing surface may be deteriorated. In particular, as described above, in a case where a thicker wiring is used, such errors become obvious.

Accordingly, it is desirable to provide a display device and an information input device which can perform detection with high accuracy and can improve the quality of displayed images.

According to an embodiment of the invention, there is provided an information input device including a touch panel which is provided with a touch sensor capable of sensing a position in which a sensing target body is close to a sensing surface thereof, wherein the touch sensor includes a scanning electrode and a detection electrode which faces and is spaced from the scanning electrode with a dielectric body being interposed therebetween, the touch sensor being an electrostatic capacitance touch sensor which is configured so that electrostatic capacitance which is formed between the scanning electrode and the detection electrode is varied when the sensing target body is close to the detection electrode, and wherein the detection electrode is formed with a slit in a surface thereof which faces the scanning electrode, and a floating electrode is installed in the slit.

According to another embodiment of the invention, there is provided a display device including a display panel which is provided with a touch sensor capable of sensing a position, where a sensing target body is close, in a display surface on which an image is displayed, wherein the touch sensor includes a scanning electrode and a detection electrode which faces and is spaced from the scanning electrode with a dielectric body being interposed therebetween, the touch sensor being an electrostatic capacitance touch sensor which is configured so that electrostatic capacitance which is formed between the scanning electrode and the detection electrode is varied when the sensing target body is close to the detection electrode, and wherein the detection electrode is formed with a slit in a surface thereof which faces the scanning electrode, and a floating electrode is installed in the slit.

In the embodiments of the invention, the slit is formed in the surface of the detection electrode of the electrostatic capacitance touch sensor, which faces the scanning electrode. Thus, a fringe electric field is generated through the slit. Further, the floating electrode is installed in the slit. Accordingly, a change in electrostatic capacitance in the touch sensor becomes significant in the presence or absence of the sensing target body such as a finger.

According to the embodiments of the invention, it is possible to provide a display device and an information input device which can easily perform detection with high accuracy.

BRIEF DESCRIPTION OF THE DRAWINGS

FIG. 2 is a diagram illustrating the entire configuration of a liquid crystal display panel according to the first embodiment of the invention;

FIG. 11 is a diagram illustrating an operation of the touch sensor TS according to the first embodiment of the invention;

FIGS. 13A and 13B are schematic diagrams illustrating a state at the time when the touch sensor TS is driven, according to the first embodiment of the invention;

FIGS. 27A, 27B, 27C and 27D are diagrams illustrating a detailed configuration of a detection electrode according to a modified embodiment of the invention;

DESCRIPTION OF THE PREFERRED EMBODIMENTS

Exemplary embodiments according to the invention will be described. The description will be made in the following order.

1. First embodiment (a case where a touch sensor is built in)
2. Second embodiment (a case where a touch sensor is built in on a liquid crystal display panel of an FFS type)
3. Third embodiment (a case where a touch sensor is externally provided)
4. Fourth embodiment (a case where the shape of a detection electrode is different in the case of a built-in touch sensor)
5. Fifth embodiment (a case where the shape of a detection electrode is different in the case of a built-in touch sensor)
6. Sixth embodiment (a case where the shape of a detection electrode is different in the case of a built-in touch sensor)
7. Others

1. First Embodiment

A. Configuration of Display Device

Figure 1:
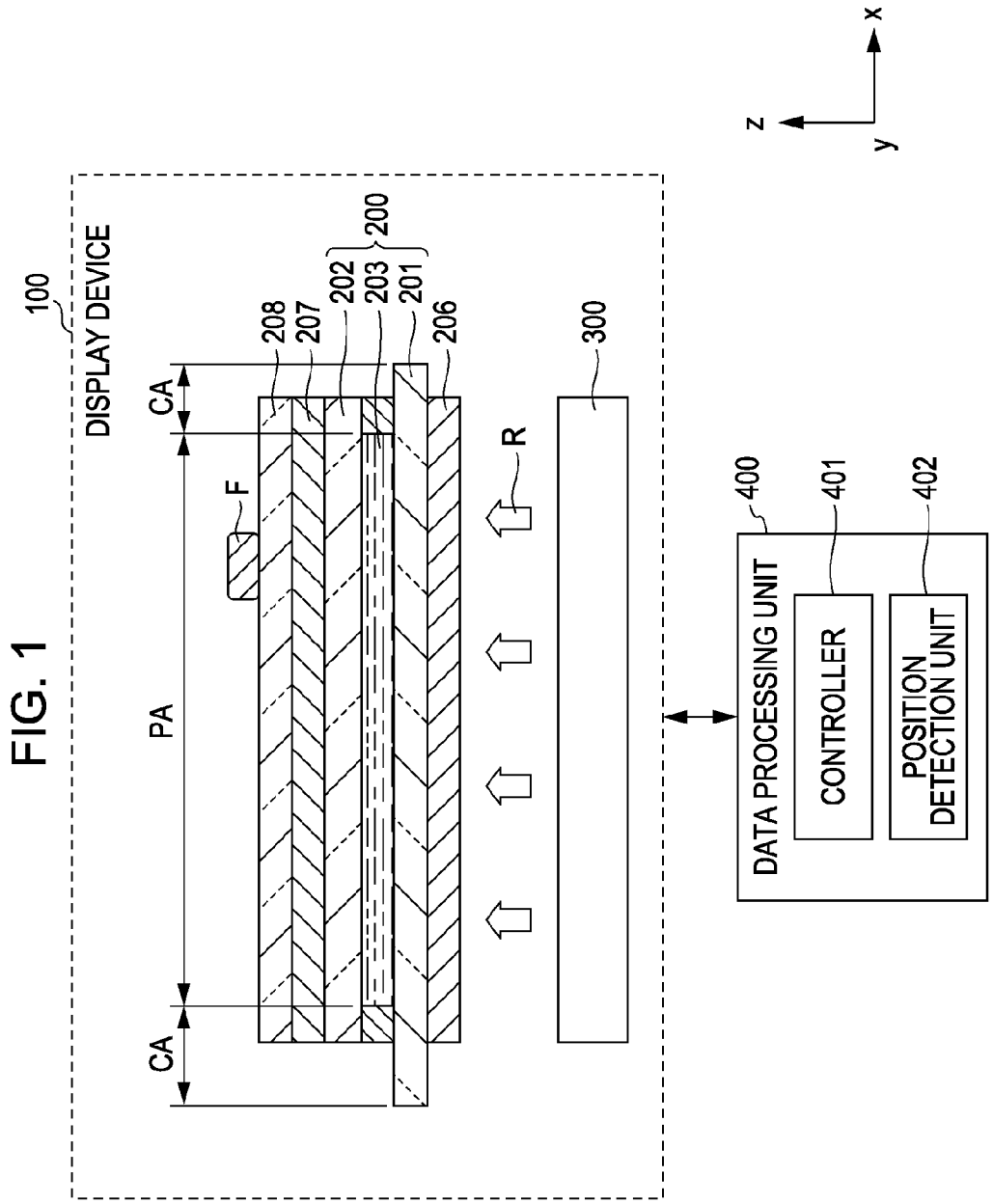
FIG. 1 is a diagram illustrating a schematic configuration of a display device according to a first embodiment of the invention.

FIG. 1 is a diagram illustrating a schematic configuration of a display device 100 according to a first embodiment of the invention.

As shown in FIG. 1, the display device 100 in this embodiment includes a liquid crystal display panel 200, a backlight 300, and a data processing unit 400. The respective components will be sequentially described.

A-1. Liquid Crystal Display Panel

The liquid crystal display panel 200 is, for example, an active matrix type. As shown in FIG. 1, the liquid crystal display panel 200 includes a TFT array substrate 201, an opposite substrate 202, and a liquid crystal layer 203. In the liquid crystal display panel 200, the TFT array substrate 201 faces and is spaced from the opposite substrate 202, and the liquid crystal layer 203 is provided between the TFT array substrate 201 and the opposite substrate 202.

As shown in FIG. 1, in the TFT array substrate 201 in the liquid crystal display panel 200, a first polarizing plate 206 is arranged on a lower surface thereof which is opposite to an upper surface thereof which faces the opposite substrate 202. Further, in the opposite substrate 202, a second polarizing plate 207 is arranged on an upper surface thereof which is opposite to a lower surface thereof which faces the TFT array substrate 201. Further, a cover glass 208 is arranged on an upper surface of the second polarizing substrate 207.

As shown in FIG. 1, in the liquid crystal display panel 200, the backlight 300 is arranged under the TFT array substrate 201, and an illumination light R which is emitted from the backlight 300 illuminates the lower surface of the TFT array substrate 201.

The liquid crystal display panel 200 in this embodiment is a transmission type, in which the illumination light R is transmitted in a display area PA, and thus, an image display is performed.

Hereinafter, a detailed description thereof will be made. A plurality of pixels (not shown) is arranged in the display area PA. Further, in the display area PA, the illumination backlight R emitted by the backlight 300 which is installed in the rear of the liquid crystal display panel 200 is received from a rear surface thereof through the first polarizing substrate 206, and is modulated from the rear surface thereof. In this respect, in the TFT array substrate 201, a plurality of TFTs is installed as pixel switching elements (not shown) so as to correspond to the plurality of pixels. As the pixel switching elements are controlled, the illumination light R which is received from the rear surface is modulated. Further, the modulated illumination light R is emitted toward a front surface side thereof through the second polarizing substrate 207, and thus, an image is displayed in the display area PA. For example, a color image is displayed on the front surface side of the liquid crystal display panel 200.

In addition, in this embodiment, the liquid crystal display panel 200 is provided with a touch sensor (not shown) for sensing a position where a sensing target body is close to a sensing surface. In the liquid crystal display panel 200, the touch sensor is an electrostatic capacitance type, and is configured so as to output an electric potential signal varying according to a position where a sensing target body F such as a finger of a user is close to or comes in contact with the sensing surface in a front surface thereof which is opposite to a rear surface thereof in which the backlight 300 is installed. That is, the liquid crystal display panel 200 serves as the display panel and also serves as the touch panel, and thus, the display device 100 which is the liquid crystal display device serves as the information input device.

A-2. Backlight

As shown in FIG. 1, the backlight 300 faces the rear surface of the liquid crystal display panel 200 and emits the illumination light R toward the display area PA of the liquid crystal display panel 200.

Specifically, with respect to the TFT array substrate 201 and the opposite substrate 202, the backlight 300 is arranged under the TFT array substrate 201. That is, the backlight 300 emits the illumination light R to the surface of the TFT array substrate 201 which is opposite to the surface thereof which faces the opposite substrate 202. That is, the backlight 300 emits the illumination light R so that the illumination light R is directed toward the opposite substrate 202 from the TFT array substrate 201. In this respect, the backlight 300 emits the illumination light R so as to follow in a normal line direction z with respect to a surface of the liquid crystal display panel 200.

A-3. Data Processing Unit

As shown in FIG. 1, the data processing unit 400 includes a controller 401 and a position detection unit 402. The data processing unit 400 includes a computer, and is configured so that the computer operates as the controller 401 and the position detection unit 402 on the basis of computer programs.

In the data processing unit 400, the controller 401 controls operations of the liquid crystal display panel 200 and the backlight 300. The controller 401 supplies a control signal to the liquid crystal display panel 200 to control an operation of the plurality of pixel switching elements (not shown) which is installed in the liquid crystal display panel 200. For example, the controller 401 performs line sequential driving. Further, the controller 401 supplies a control signal to the backlight 300 to control the operation of the backlight 300, and enables the backlight 300 to emit the illumination light R. In this way, the controller 401 controls the operations of the liquid crystal display panel 200 and the backlight 300, to thereby display an image in the display area PA of the liquid crystal display panel 200.

In addition, the controller 401 supplies the control signal to the liquid crystal display panel 200 to control an operation of the touch sensor which is installed in the liquid crystal display panel 200 and to collect detection data from the touch sensor.

The position detection unit 402 of the data processing unit 400 is configured to detect a coordinate position in which the sensing target body F such as a finger of a human is close to the display area PA, in a side of the front surface (display surface) of the liquid crystal display panel 200. In this embodiment, the position detection unit 402 performs the detection of the coordinate position on the basis of the detection data which is obtained by the touch sensor which is installed in the liquid crystal display panel 200.

B. Entire Configuration of Liquid Crystal Display Panel

The entire configuration of the liquid display panel 200 will be described.

FIG. 2 is a diagram illustrating the entire configuration of the liquid crystal display panel 200 according to the first embodiment of the invention, which is a plan view of the liquid crystal display panel 200.

As shown in FIG. 2, the liquid crystal display panel 200 includes the display area PA and a circumferential area CA.

As shown in FIG. 2, the plurality of pixels P is arranged over a surface in the display area PA of the liquid crystal display panel 200. Specifically, in the display area PA, the plurality of pixels P is aligned in a matrix format in a horizontal direction x and a vertical direction y, to thereby display images.

Hereinafter, detailed description thereof will be made. The pixels P include the above described pixel switching elements (not shown). Further, the plurality of touch sensor (not shown) is installed to correspond to the plurality of pixels P.

As shown in FIG. 2, the circumferential area CA in the liquid crystal display panel 200 is positioned to surround the display area PA. As shown in FIG. 2, a vertical driving circuit 11 and a horizontal driving circuit 12 are formed in the circumferential area CA. For example, each circuit is formed of a semiconductor element which is formed in a similar way to the pixel switching elements (not shown) or the like.

Further, the pixel switching elements which are installed to correspond to the pixels P are driven by the vertical driving circuit 11 and the horizontal driving circuit 12, to thereby perform image display in the display area PA.

In addition, the vertical driving circuit 11 is formed to drive the touch sensor (not shown) which is installed in the display area PA, and a detector (not shown) is installed in the circumferential area CA in order to detect detection data which is obtained by the driving of the touch sensor. Further, on the basis of the detection data obtained from the touch sensor, the position detection unit 402 detects a position in which the sensing target body such as a finger of a user comes in contact with the sensing surface in the display area PA of the liquid crystal display panel 200.

C. Detailed Configuration of Liquid Crystal Display Panel

A detailed configuration of the liquid crystal display panel 200 will be described.

Figure 3:
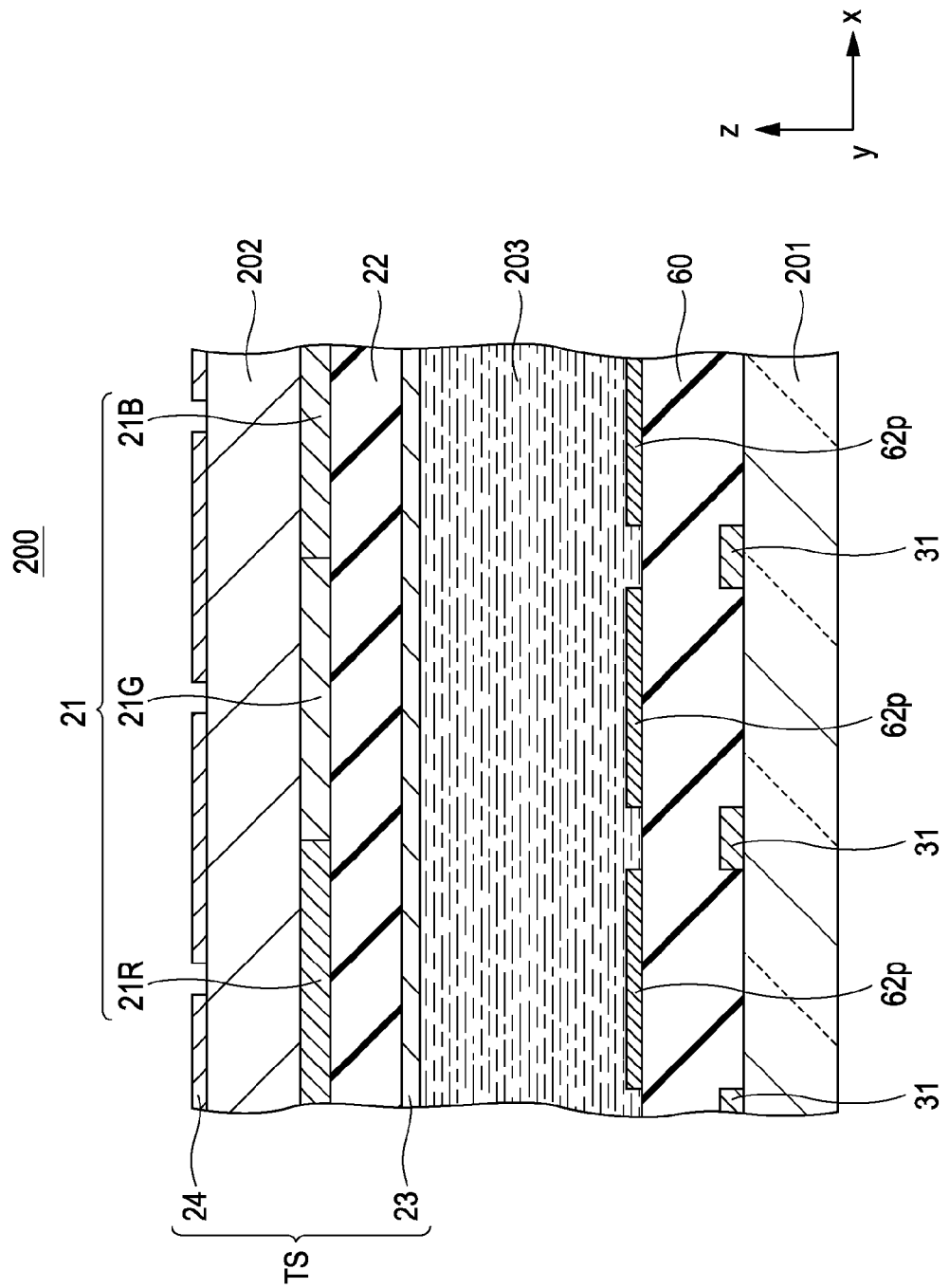
FIG. 3 is a diagram illustrating a detailed configuration of the liquid crystal display panel according to the first embodiment of the invention.
Figure 4:
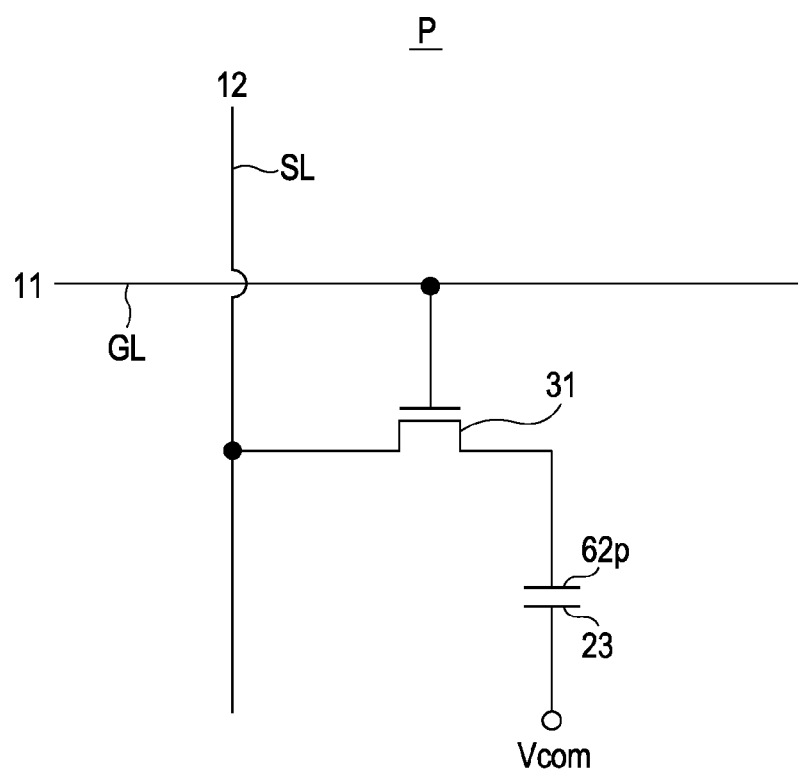
FIG. 4 is a diagram illustrating a detailed configuration of the liquid crystal display panel according to the first embodiment of the invention.
Figure 5:
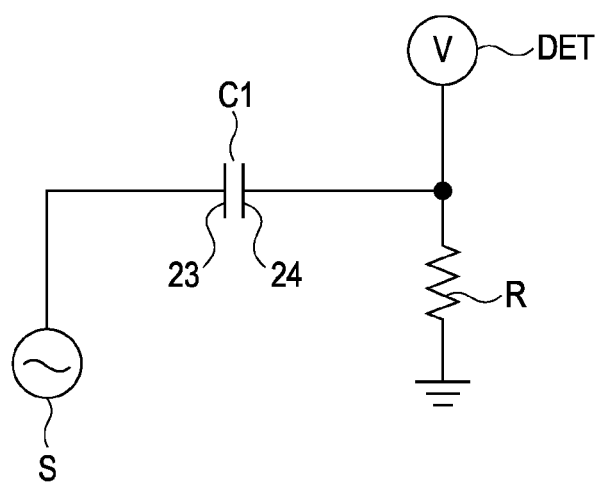
FIG. 5 is a diagram illustrating a detailed configuration of the liquid crystal display panel according to the first embodiment of the invention.

FIGS. 3, 4 and 5 are diagrams illustrating detailed configurations of the liquid crystal display panel 200 in the first embodiment of the invention.

Here, FIG. 3 is a sectional view schematically illustrating the pixels P; FIG. 4 is a circuit diagram schematically illustrating the pixels P; and FIG. 5 is a circuit diagram schematically illustrating a touch sensor TS.

As shown in FIG. 3, the liquid crystal display panel 200 includes the TFT array substrate 201 and the opposite substrate 202. A spacer (not shown) is formed between the TFT array substrate 201 and the opposite substrate 202, and the TFT array substrate 201 and the opposite substrate 202 are attached to each other by a sealing material (not shown). Further, the liquid crystal layer 203 is enclosed between the TFT array substrate 201 and the opposite substrate 202.

Further, in this embodiment, as shown in FIG. 3, the liquid crystal display panel 200 is provided with the touch sensor TS, and serves as the touch panel as well as the display panel.

In this respect, as shown in FIG. 5, the touch panel TS includes an electrostatic capacitance element C1 which is provided with an opposite electrode 23 and a detection electrode 24, and is configured so that capacitance of the electrostatic capacitance element C1 is varied when the sensing target body (not shown) is close to the detection electrode 24.

Respective components which form the liquid crystal display panel 200 will be described hereinafter.

C-1. TFT Array Substrate

The TFT array substrate 201 which forms the liquid crystal display panel 200 will be described hereinafter.

The TFT array substrate 201 is an insulating substrate which transmits light, and for example, is formed of glass. As shown in FIG. 3, a pixel switching element 31 and a pixel electrode 62p are formed in the TFT array substrate 201.

Respective components which are installed in the TFT array substrate 201 will be described.

In the TFT array substrate 201, as shown in FIG. 3, the pixel switching element 31 is installed on a surface of the TFT array substrate 201 which is opposite to the opposite substrate 202. The pixel switching element 31 is a bottom gate type TFT using, for example, polysilicon.

In a TFT which is the pixel switching element 31, as shown in FIG. 4, a gate electrode is electrically connected to a gate line GL.

Here, as shown in FIG. 4, the gate line GL extends along a direction x. The gate line GL is not shown in FIG. 3, but is formed to be integrated with the gate electrode of the pixel switching element 31 in the surface of the TFT array substrate 201 as shown in FIG. 3. For example, the gate line GL is formed of a metallic material such as molybdenum, and forms a light cutoff area which cuts off light without transmission in the liquid crystal display panel 200.

Further, as shown in FIG. 4, the gate line GL is electrically connected to the vertical driving circuit 11, and a scanning signal Vgate is supplied from the vertical driving circuit 11 to the gate electrode of the pixel switching element 31 through the gate line GL from the vertical driving circuit 11.

In addition, in the TFT which is the pixel switching element 31, as shown in FIG. 4, one side of a source-drain area is electrically connected to a signal line SL.

Here, as shown in FIG. 4, the signal line SL is formed to extend in the direction y, and is electrically connected to the horizontal driving circuit 12. The signal line SL outputs an image data signal input from the horizontal driving circuit 12 to the pixel switching element 31.

The signal line SL is not shown in FIG. 3, but the signal line SL is formed in an interlayer insulating layer Sz which is formed on the TFT array substrate 201 to cover the pixel switching element 31. For example, the signal line SL is formed of a conductive material which cuts off light. Specifically, the signal line SL is formed of a metallic material and forms a light cutoff area which cuts off light without transmission in the liquid crystal display panel 200.

On the other hand, in the pixel switching element 31, the other side of the source-drain area is electrically connected to the pixel electrode 62p, as shown in FIG. 4.

As shown in FIG. 3, in the TFT array substrate 201, the pixel electrode 62p is installed through the interlayer insulating layer Sz above the surface of the TFT array substrate 201 which is opposite to the opposite electrode 202. The pixel electrode 62p is a so-called transparent electrode, for example, is formed of ITO.

As shown in FIG. 4, the pixel electrode 62p is electrically connected to the pixel switching element 31, and receives the image data signal which is input from the horizontal driving circuit 12 when the pixel switching element 31 is in a turned on state, and then applies voltage to the liquid crystal layer 203. Thus, an alignment direction of liquid crystal molecules which form the liquid crystal layer 203 is changed, and the light which passes through the liquid crystal layer 203 is modulated. Thus, the image display is performed.

C-2. Opposite Substrate 202

The opposite substrate 202 which forms the liquid crystal display panel 200 will be described hereinafter.

The opposite substrate 202 is an insulating substrate which transmits light in a similar way to the TFT array substrate 201, and is formed, for example, of glass. As shown in FIG. 3, the opposite substrate 202 faces and is spaced from the TFT array substrate 201. To the opposite substrate 202 are provided a color filter layer 21, the opposite electrode 23, the detection electrode 24, and a floating electrode 25.

The respective components which are installed in the opposite substrate 202 will be described.

As shown in FIG. 3, in the opposite substrate 202, the color filter layer 21 is formed on a surface of the opposite electrode 202 which is opposite to the TFT array substrate 201. The color filter layer 21 includes a red filter 21R, a green filter 21G, and a blue filter 21B, which are formed to be aligned in the direction x, respectively. That is, the color filter layer 21 includes a set of color filters of three primary colors of red, green and blue, and each color filter is installed for every pixel P. The color filter layer 21 is formed, for example, of a polyimide resin which contains coloring agents such as pigments or dyestuffs corresponding to the respective colors. The color filter layer 21 colors white light which is emitted from the backlight 300 and emits the colored light.

As shown in FIG. 3, a planarization layer 22 is coated on the surface of the color filter layer 21 which faces the TFT array substrate 201. The planarization layer 22 is formed of a light transmissive insulting material, and planarizes the surface of the opposite substrate 202 which faces the TFT array substrate 201.

As shown in FIG. 3, in the opposite substrate 202, the opposite electrode 23 is provided to the surface of the opposite substrate 202 which faces the TFT array substrate 201. Here, the opposite electrode 23 is formed to cover the planarization layer 22. The opposite electrode 23 is a transparent electrode which transmits visible light, and is formed, for example, of ITO.

As shown in FIG. 3, the opposite electrode 23 is installed so that the liquid crystal layer 203 is disposed between the pixel electrode 62p and the opposite electrode 23, and serves as a common electrode which applies voltage to the liquid crystal layer 203 which is disposed between the pixel electrode 62p and the opposite electrode 23.

Further, in this embodiment, as shown in FIGS. 3 and 5, the opposite electrode 23 is installed so that a dielectric body (opposite substrate 202 or the like in FIG. 3) is disposed between the detection electrode 24 and the opposite electrode 23 to form the electrostatic capacitance element C1. That is, the opposite electrode 23 is installed to form the electrostatic capacitance touch sensor TS together with the detection electrode 24. Here, as shown in FIG. 5, the opposite electrode 23 is electrically connected to a sensor driving unit S, and receives a driving signal Sg which is output from the sensor driving unit S.

Figure 6:
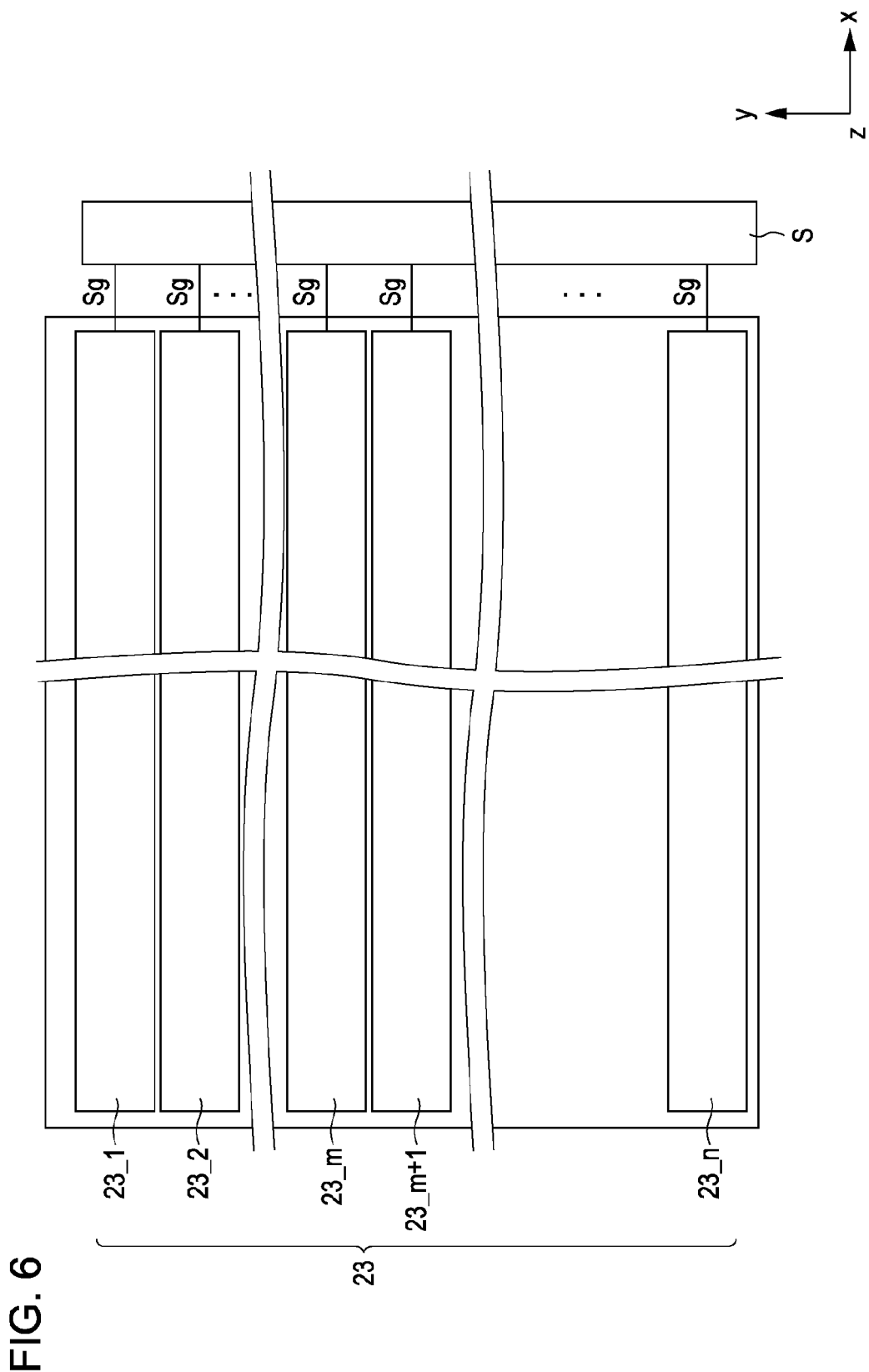
FIG. 6 is a diagram illustrating a detailed configuration of an opposite electrode according to the first embodiment of the invention.

FIG. 6 is a diagram illustrating a detailed configuration of the opposite electrode 23 according to the first embodiment of the invention, which is a top view of the opposite electrode 23.

As shown in FIG. 6, the opposite electrode 23 is a stripe shape and extends in the horizontal direction x in the surface of the opposite substrate 202. In this respect, the plurality of opposite electrodes 23 is aligned to be spaced from each other in the vertical direction y. That is, n items of opposite electrodes of a first opposite electrode 23_1 to an n-th opposite electrode 23_n are installed from the upside to the downside, as the opposite electrodes 23. Here, the plurality of opposite electrodes 23 is installed with an equivalent interval to respectively face the plurality of pixel electrodes 62p which is aligned in the vertical direction y.

As shown in FIG. 6, the first to the n-th opposite electrodes 23_1 to 23_n are electrically connected to the sensor driving unit S, respectively. The first to the n-th opposite electrodes 23_1 to 23_n are sequentially selected and are supplied with the driving signal Sg which is output from the sensor driving unit S. That is, the first to the n-th opposite electrodes 23_1 to 23_n are supplied with the driving signal Sg by means of line sequential scanning driving.

For example, the opposite electrode 23 is preferably formed under the following conditions.

The width of the opposite electrode 23 is 1 mm.

The interval between the opposite electrodes 23 is 5 mm.

In the opposite substrate 202, as shown in FIG. 3, the detection electrode 24 is formed on the surface of the opposite electrode 202 which is opposite to the surface thereof which faces the TFT array substrate 201. The detection electrode 24 is a transparent electrode which transmits visible light, and is formed, for example, of ITO.

As shown in FIGS. 3 and 5, the detection electrode 24 is installed so that a dielectric body (opposite substrate 202 or the like in FIG. 3) is disposed between the opposite electrode 23 and the detection electrode 24 to form the electrostatic capacitance touch sensor TS. Further, as shown in FIG. 5, the detection electrode 24 is electrically connected to a detector DET, and at the same time is grounded through a resistor R. The detection electrode 24 outputs a detection signal Vdet to the detector DET.

Hereinafter, detailed description thereof will be made. In a case where the sensing target body which is a conductor having large capacitance such as a finger is close to the detection electrode 24, a fringe electric field due to the opposite electrode 23, in which the driving signal Sg is input, is cut off by the sensing target body. Thus, in the touch sensor TS, the capacitance thereof is varied according to the presence or absence of the sensing target body, and thus, an electric potential of the detection electrode 24 is varied. Accordingly, as the electric potential change is detected by the detector DET, a contact position can be detected.

Figure 7:
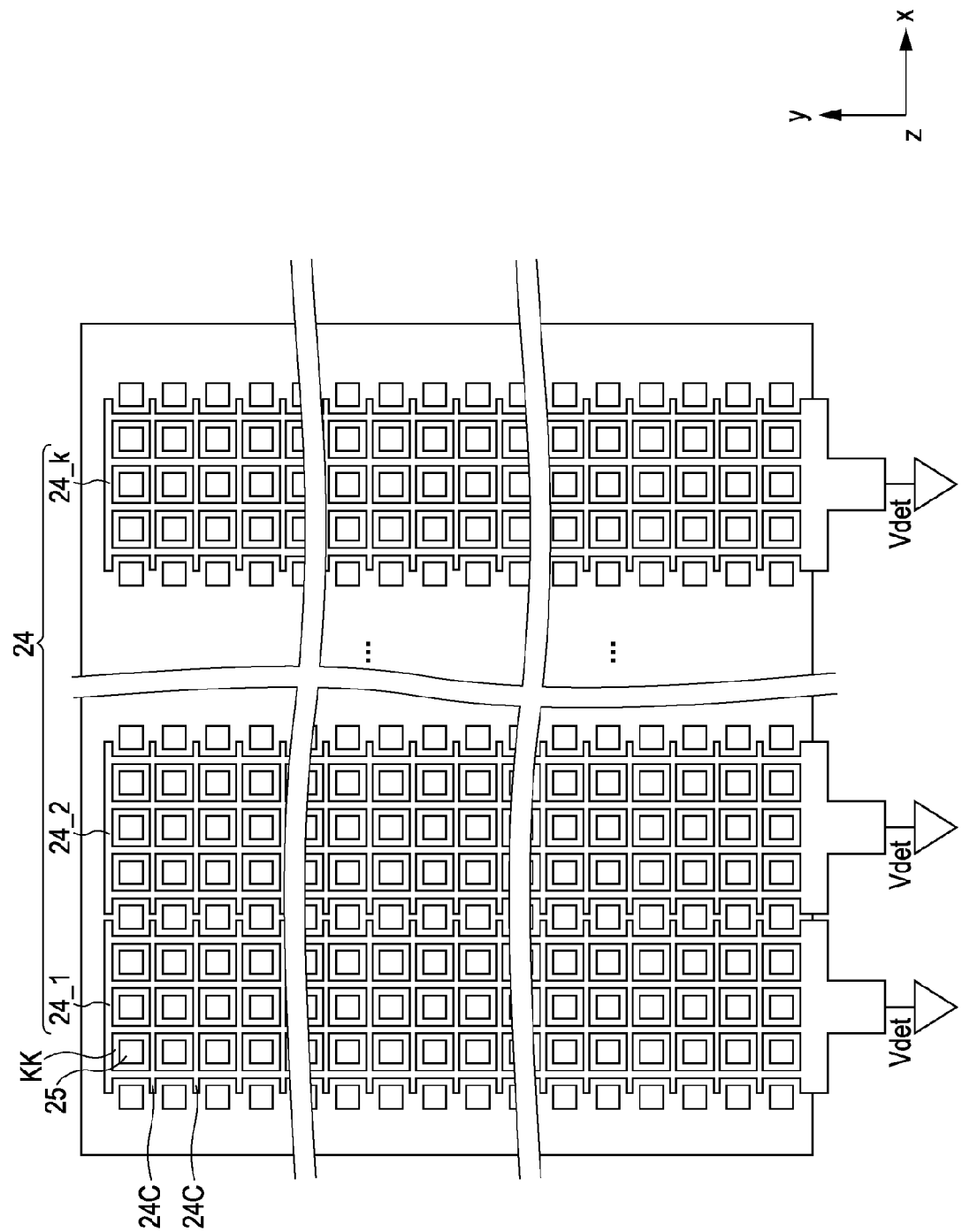
FIG. 7 is a diagram illustrating a detailed configuration of a detection electrode according to the first embodiment of the invention.

FIG. 7 is a diagram illustrating a detailed configuration of the detection electrode 24 according to the first embodiment of the invention, which is a top view of the detection electrode 24.

As shown in FIG. 7, the detection electrode 24 is a stripe shape and extends in the vertical direction y in the surface of the opposite substrate 202. In this respect, the plurality of detection electrodes 24 is aligned to be spaced from each other in the horizontal direction x. That is, k items of detection electrodes of a first detection electrode 24_1 to a k-th detection electrode 24_k are installed from the left side to the right side, as the detection electrodes 24.

As shown in FIG. 7, the first to k-th detection electrodes 24_1 to 24_k are electrically connected to the detector DET, respectively. Hereinafter, detailed description thereof will be made. The detection signal Vdet is output to the detector DET in each of the first detection electrode 24_1 to the k-th detection electrode 24_k.

In this embodiment, as shown in FIG. 7, each of the detection electrodes 24 is formed with a slit KK on a surface thereof which faces the opposite electrode 23. The slit KK is a square shape. The plurality of slits KK are aligned to be spaced from each other in the horizontal direction x and the vertical direction y inside the respective detection electrodes 24.

Further, as shown in FIG. 7, each of the detection electrodes 24 is formed with a protrusion section 24C which extends in the vertical direction y, in a side edge thereof. The protrusion section 24C protrudes in a protrusion manner in the horizontal direction x. The protrusion sections 24C are aligned and spaced from each other in the vertical direction y with an interval. Here, the plurality of protrusion sections 24C is sequentially aligned in the vertical direction y in the state where one slit KK is disposed between the adjacent protrusion sections 24C.

As shown in FIG. 7, the floating electrode 25 is installed inside each slit KK. Here, the plurality of floating electrodes 25 is installed to be aligned in the horizontal direction x and the vertical direction y, so as to correspond respectively to the plurality of slits KK. In a similar way to the floating electrode 24, the floating electrode 25 is a transparent electrode which transmits visible light, and is formed, for example, of ITO. In this embodiment, the floating electrode 25 is a square shape which is similar to the slit KK, and of which each side is formed to be smaller than each side of the slit KK.

The detection electrode 24 and the floating electrode 25 are preferably formed under the following conditions.

The width of the detection electrode 24 is 4 to 8 mm.
The width of the protrusion section 24C is 5 μm.
The width of the slit KK is 30 μm.
The width of the floating electrode 25 is 20 μm.

C-3. Liquid Crystal Layer 203

The liquid crystal layer 203 which forms the liquid crystal display panel 200 will be described.

As shown in FIG. 3, the liquid crystal layer 203 is disposed between the TFT array substrate 201 and the opposite substrate 202 which face each other.

Here, in the liquid crystal layer 203, the liquid crystal molecules (not shown) are aligned by a liquid crystal alignment layer (not shown) which is formed in the TFT array substrate 201 and a liquid crystal alignment layer (not shown) which is formed in the opposite substrate 202. For example, the liquid crystal layer 203 is formed so that the liquid crystal molecules are vertically aligned. The liquid crystal layer 203 is configured so that the alignment direction of the liquid crystal molecules is varied according to application of voltage by means of the pixel electrode 62p and the opposite electrode 23. The liquid crystal layer 203 may be formed to correspond to a TN mode or an ECB mode, in addition to a VA mode.

C-4. Sensor Driving Unit S

A detailed configuration of the sensor driving unit S which is electrically connected to the opposite electrode 23 will be described hereinafter.

Figure 8:
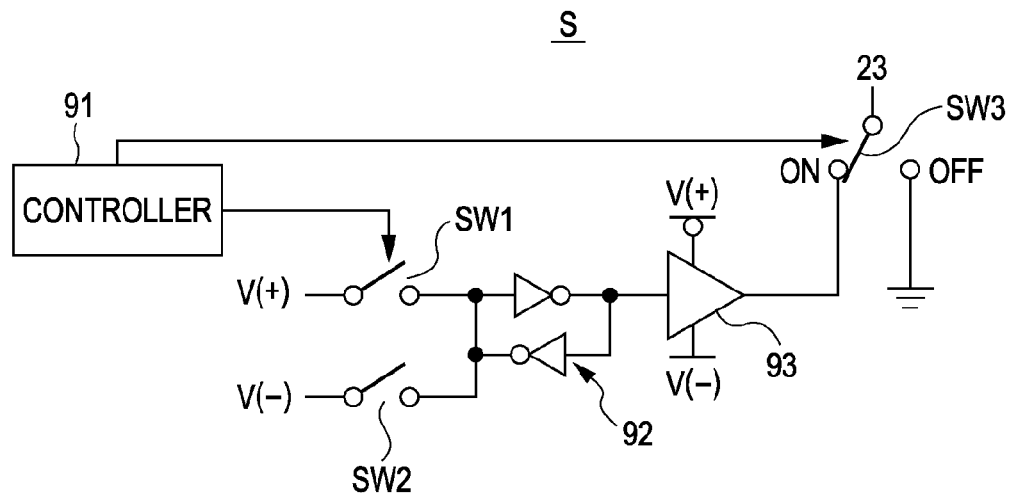
FIG. 8 is a diagram illustrating a detailed configuration of a sensor driving unit according to the first embodiment of the invention.

FIG. 8 is a diagram illustrating a detailed configuration of the sensor driving unit S according to the first embodiment of the invention.

As shown in FIG. 8, the sensor driving unit S includes a controller 91, a first switch SW1, a second switch SW2, a latch circuit 92, a buffer circuit 93 and a third switch SW3, and serves as an alternating current source. For example, the sensor driving unit S applies the driving signal Sg which is an alternating current rectangular wave having a frequency of several kHz to several tens of kHz and is a common electric potential Vcom, to the opposite electrode 23.

Hereinafter, respective components which form the sensor driving unit S will be sequentially described.

In the sensor driving unit S, as shown in FIG. 8, the controller 91 is formed as a circuit for controlling switching operations of the first switch SW1, the second switch SW2, and the third switch SW3.

In the sensor driving section S, as shown in FIG. 8, the first switch SW1 has one terminal which is electrically connected to the latch circuit 92. Further, when the first switch SW1 is in a turned on state by a switching control of the controller 91, the first switch SW1 applies a positive voltage V(+) to the latch circuit 92.

In the sensor driving section S, as shown in FIG. 8, the second switch SW2 has one terminal which is electrically connected to the latch circuit 92. Further, when the second switch SW2 is in a turned on state by a switching control of the controller 91, the second switch SW2 applies a negative voltage V(−) to the latch circuit 92.

In the sensor driving section S, the latch circuit 92 has an input terminal which is electrically connected to the first switch SW1 and the second switch SW2, respectively. Further, the latch circuit 92 has an output terminal which is electrically connected to a third switch SW3 through the buffer circuit 93.

In the sensor driving unit S, the buffer circuit 93 is a waveform rectifying unit, and is installed as a circuit which compensates an input electric potential with respect to the positive voltage V(+) and the negative voltage V(−) to be output.

In the sensor driving unit S, a switching operation of the third switch SW3 is controlled by the controller 91. Here, the third switch SW3 is electrically connected to the opposite electrode 23 when the third switch SW3 is in a turned on state. On the other hand, the third switch SW3 is inactively connected to the ground (GND) when the third switch SW3 is in a turned off state.

The sensor driving unit S with such a configuration is installed to correspond to the plurality of opposite electrodes 23.

The above described sensor driving unit S is installed, for example, to form the vertical driving circuit 11 (see FIG. 2) in the circumferential area CA which is positioned around the display area PA in the TFT array substrate 201. In addition, the sensor driving unit S may be installed in the circumferential area CA of the opposite substrate 202.

C-5. Detector DET

A detailed configuration of the detector DET which is electrically connected to the detection electrode 24 will be described hereinafter.

Figure 9:
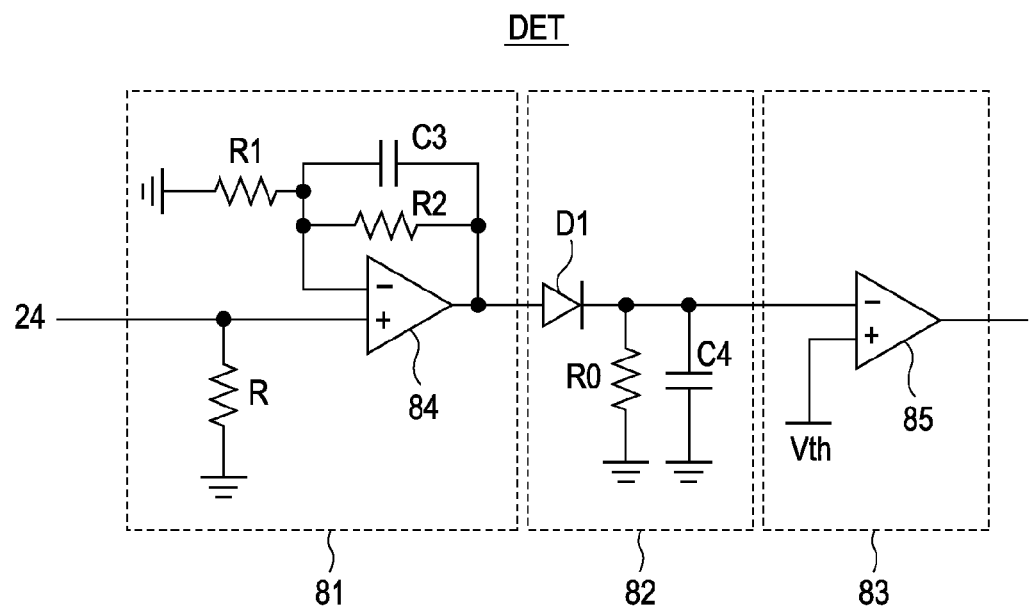
FIG. 9 is a circuit diagram illustrating a detector according to the first embodiment of the invention.

FIG. 9 is a circuit diagram illustrating the detector DET according to the first embodiment of the invention.

As shown in FIG. 9, the detector DET includes an OP amplifier circuit 81, a rectifying circuit 82, and an output 83.

Hereinafter, respective components which form the detector DET will be sequentially described.

In the detector DET, as shown in FIG. 9, the OP amplifier circuit 81 includes an OP amplifier 84, resistors R, R1 and R2, and a capacitor C3, and serves as a filter circuit as well as a signal amplifying circuit. That is, the OP amplifier circuit 81 amplifies the detection signal Vdet which is output from the detection electrode 24, and then removes a predetermined frequency component in the detection signal Vdet to output the signal to the rectifying circuit 82.

Specifically, as shown in FIG. 9, in the OP amplifier circuit 81, the detection electrode 24 is electrically connected to a positive input terminal (+) of the OP amplifier 84, and the detection signal Vdet which is output from the detection electrode 24 is input to the positive input terminal (+) of the OP amplifier 84. Here, the detection electrode 24 is connected to a ground electric potential through the resistor R in order electrically to maintain a DC level of an electric potential uniformly. Further, the resistor R2 and the capacitor C3 are connected in parallel between a negative input terminal (−) and an output terminal of the OP amplifier 84, and the resistor R1 is connected between the negative input terminal (−) and a ground electric potential of the OP amplifier 84.

As shown in FIG. 9, in detector DET, the rectifying circuit 82 includes a diode D1, a charging capacitor C4, and a discharging resistor R0. The rectifying circuit 82 half-wave-rectifies a signal output from the OP amplifier circuit 81 using the diode D1, and then smoothes the signal by a smoothing circuit which is provided with the charging capacitor C4 and the discharging resistor R0, to thereby output the smoothed signal to the output circuit 83.

Specifically, as shown in FIG. 9, in the rectifying circuit 82, an anode of the diode D1 is electrically connected to an output terminal of the OP amplifier circuit 81. Further, the charging capacitor C4 and the discharging resistor R0 are electrically connected between a cathode of the diode D1 and a ground electric potential, respectively.

In the detector DET, as shown in FIG. 9, the output circuit 83 includes a comparator 85, and serves as an AD converter which converts an analog signal output from the rectifying circuit 82 into a digital signal.

Specifically, as shown in FIG. 9, in the comparator 85, a positive input terminal (+) is electrically connected to the rectifying circuit 82. Further, in the comparator 85, a threshold value voltage Vth is input to a negative input terminal (−). In addition, the comparator 85 performs a comparison process between the threshold value voltage Vth and the analog signal output from the rectifying circuit 82, and outputs a digital signal on the basis of the comparison result.

The detector DET is installed, for example, in the circumferential area CA which is positioned around the display area PA in the opposite substrate 202. Alternatively, the detector DET may be installed in the circumferential area CA of the TFT array substrate 201.

D. Operation

Hereinafter, an operation of the display device 100 will be described.

In the display device 100, an operation when an image is displayed will be described.

When performing the image display, a controller 401 controls an operation of the liquid crystal display panel 200 (see FIG. 1). Further, as the controller 401 supplies a control signal to the backlight 300, the controller 401 controls an operation of the backlight 300 and enables the backlight 300 to emit illumination light R (see FIG. 1).

In this case, the controller 401 supplies a control signal to the liquid crystal display panel 200, to thereby drive the plurality of pixels P which is installed in the liquid crystal display panel 200 (see FIG. 2). Here, the vertical driving circuit 11 and the horizontal driving circuit 12 drive the plurality of pixels P which is arranged in the display area PA.

Specifically, the vertical driving circuit 11 supplies the driving signal to a gate of the pixel switching element 31 through the gate line GL, to thereby set the pixel switching element 31 in a turned on state (see FIG. 4).

Further, the vertical driving circuit 11 supplies the driving signal Sg to each of the plurality of opposite electrodes 23. In this respect, the plurality of opposite electrodes 23 which is aligned in the vertical direction y is selected in a line sequential manner, and the driving signal Sg is supplied to the selected opposite electrode 23. That is, each of the first to n-th opposite electrodes 23_1 to 23_n is supplied with the driving signal Sg by the line sequential scanning driving, which becomes a common electric potential Vcom. That is, the vertical driving circuit 11 serves as the sensor driving unit S (see FIG. 8, etc.).

At this time, the horizontal driving circuit 12 supplies an image signal to the pixel electrode 62p through the pixel switching element 31 from the signal line SL.

Thus, an electric field is applied to the liquid crystal layer 203 which is disposed between the pixel electrode 62p and the opposite electrode 23. Thus, alignment of the liquid crystal molecules of the liquid crystal layer 203 is varied, and light which passes through the liquid crystal layer 203 is modulated. Thus, image display is performed in the display area PA.

The above image display operation is performed by a Vcom inverting driving method.

In the display device 100, an operation at the time when a position in which the sensing target body F such as a finger of a user is in contact with the display area PA of the liquid crystal display panel 200 is detected will be described.

Figure 10:
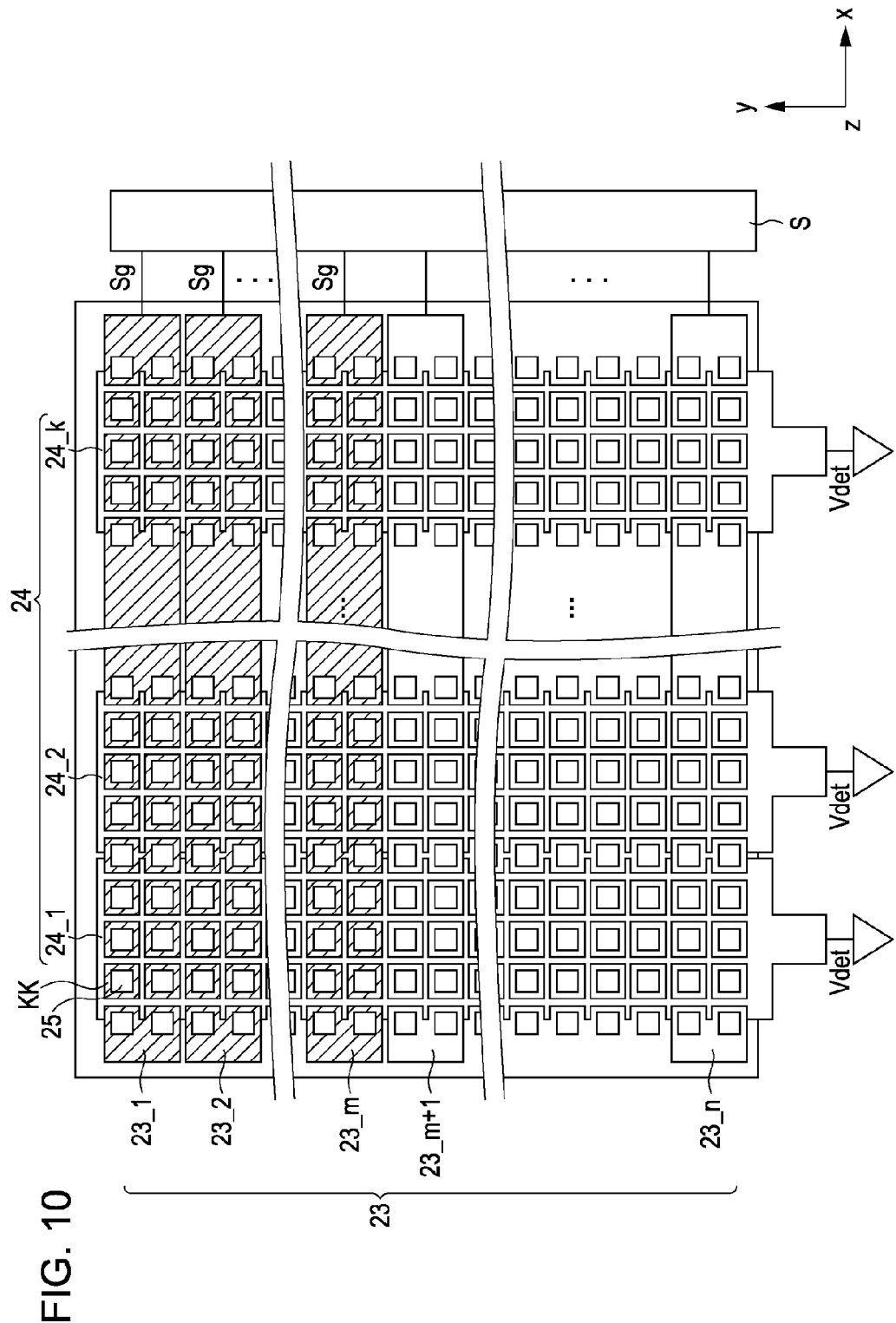
FIG. 10 is a diagram illustrating an operation of a touch sensor TS according to the first embodiment of the invention.

FIGS. 10 and 11 are diagrams illustrating an operation of the touch sensor TS according to the first embodiment of the invention, which are top views illustrating the opposite electrode 23 and the detection electrode 24. Referring to FIGS. 10 and 11, in the above described image display operation, the opposite electrode 23 which is supplied with the driving signal Sg from the vertical driving circuit 11 and becomes the common electric potential Vcom, among the plurality of opposite electrodes 23, is indicated by diagonal lines.

When the image display operation is performed, as indicated by the diagonal lines in FIGS. 10 and 11, a part of the plurality of opposite electrodes 23 is selected and is supplied with the driving signal Sg.

In this embodiment, as shown in FIGS. 10 and 11, among the n items of opposite electrodes 23_1 to 23_n, m items of opposite electrodes (23_1 to m, 23_2 to 23_m+1, ... ) (2<m<n) are selected and are supplied with the driving signal Sg. That is, the m items of opposite electrodes 23 simultaneously become the common electric potential Vcom.

The m items of opposite electrodes 23 are shifted in the vertical direction y for selection, and are supplied with the driving signal Sg.

For example, as indicated by the diagonal lines in FIG. 10, the first opposite electrode 23_1 to the m-th opposite electrode 23_m are selected. The selected m items of the first opposite electrode 23_1 to the m-th opposite electrode 23_m each are supplied with the driving signal Sg.

Next, as indicated by the diagonal lines in FIG. 11, the second opposite electrode 23_2 to the (m+1)-th opposite electrode 23_m+1 are selected. The selected m items of the second opposite electrode 23_2 to the (m+1)-th opposite electrode 23_m+1 each are supplied with the driving signal Sg. In this way, from the uppermost side to the lowermost side, the opposite electrodes 23 are sequentially selected and are supplied with the driving signal Sg. After the selection is performed up to the lowermost side, for example, the procedure returns to the uppermost side to repeat the same operation.

As described above, when the image display operation is performed, the touch sensor driving operation, in which the predetermined opposite electrode 23 is selected from the plurality of opposite electrodes 23 and the driving signal is supplied to the selected opposite electrode 23, is repeatedly performed, and thus, the controller 401 drives the touch sensor TS.

Specifically, the m items of opposite electrodes 23 which are continuously aligned in the n (m<n) items of opposite electrodes 23 is selected, and the Vcom inverting driving (alternating current driving) is performed. Thus, the shift operation that the selection target is varied in the vertical direction y is performed so that at least one opposite electrode 23 becomes common before and after each shift operation. In addition, with respect to the m items of opposite electrodes 23 selected according to the shift operation, the Vcom inverting driving is performed.

That is, when the touch sensor driving operation is performed, the m items of opposite electrodes 23 which are continuously aligned in the vertical direction y, among the n (2<m<n) items of opposite electrodes 23, are selected as a scanning electrode group. Further, the scanning electrode group is selected so that a different opposite electrode and a common opposite electrode are included between the continuous touch sensor driving operations.

As the above described operation is performed, when the opposite electrode 23 is supplied with the driving signal Sg and becomes the common electric potential Vcom, as shown in FIG. 10, electric charges are accumulated in a capacitance element of a region in which the opposite electrode 23 intersects with the detection electrode 24. Further, when the shift operation is performed as described above, charging and discharging is performed in the capacitance element of the region in which the opposite electrode 23 intersects with the detection electrode 24. In this respect, according to the scanning of the driving signal Sg, rows of the capacitance elements which become targets for the charging and discharging move in a line sequential manner. Thus, the detection signal Vdet is output to each detector DET from each detection electrode 24 with a signal intensity corresponding to a capacitance value of the capacitance element thereof.

Further, on the basis of the detection signal Vdet which is output from the detector DET, the position detection unit 402 (see FIG. 1) of the data processing unit 400 performs the position detection.

Figure 12A:
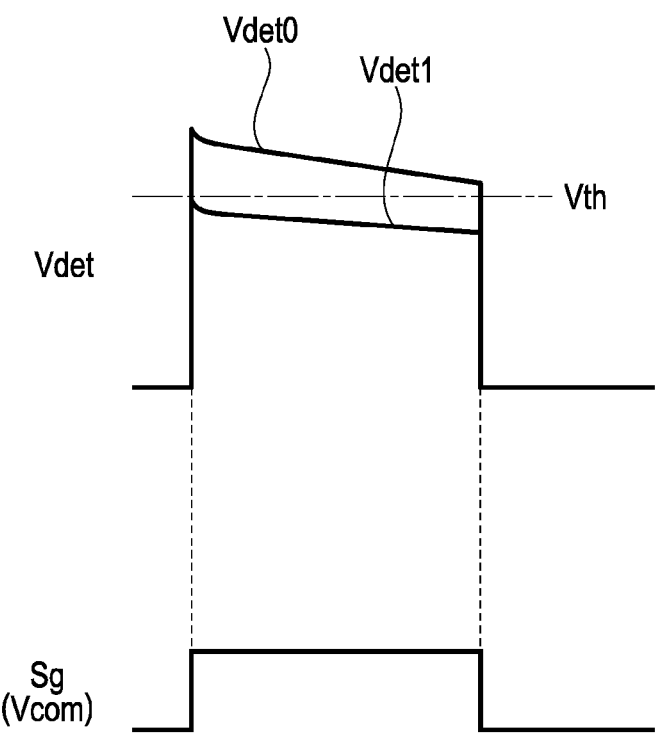
FIGS. 12A and 12B are waveform diagrams illustrating a driving signal Sg and a detection signal Vdet according to the first embodiment of the invention.
Figure 12B:

FIGS. 12A and 12B are waveform diagrams illustrating the driving signal Sg and the detection signal Vdet according to the first embodiment of the invention.

As shown in FIGS. 12A and 12B, the driving signal Sg of a rectangular wave is output to the opposite electrode 23, the detection signal Vdet is output from the detection electrode 24.

In the case where a sensing target body is not close to the detection electrode 24, as shown in FIGS. 12A and 12B, a detection signal Vdet0 is output with a signal intensity which is larger than a threshold value Vth. In this case, the detection signals Vdet0 which are output from the plurality of detection electrodes 24 each have approximately a uniform signal intensity.

Figure 33A:
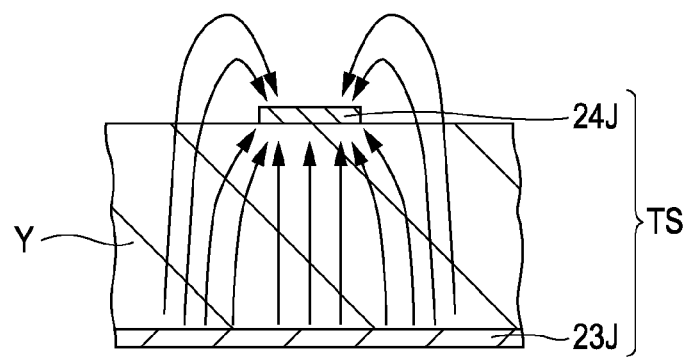
FIGS. 33A and 33B are diagrams illustrating a state at the time when an electrostatic capacitance touch sensor TS is driven.
Figure 33B:
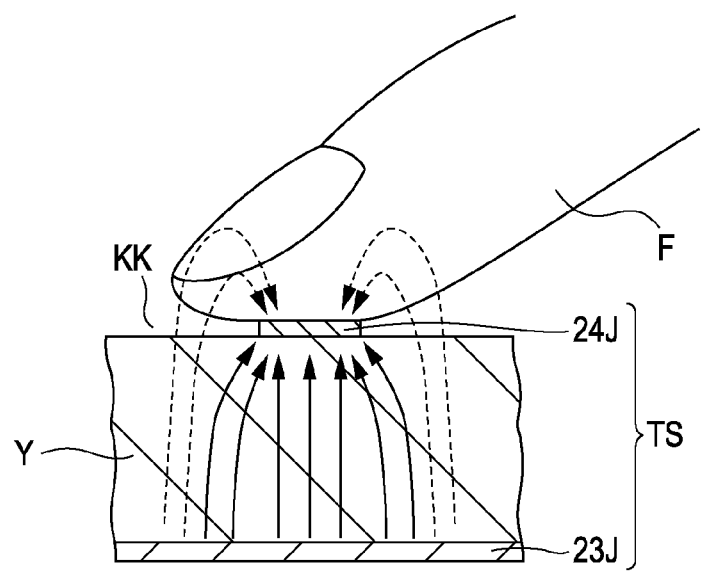

In this respect, in a case where the sensing target body such as a finger having large electrostatic capacitance is close to the sensing surface, a fringe electric field is cut off (see FIG. 33) due to the sensing target body, and thus, the electrostatic capacitance due to the opposite electrode 23 and the detection electrode 24 is varied according to the presence or absence of the sensing target body. Thus, as shown in FIG. 11, a detection signal Vdet having a signal intensity which is lower than the threshold value Vth is output. Thus, since the detection signals Vdet which are output from the plurality of detection electrodes 24 each are varied in signal intensity according to the presence or absence of the sensing target body, a position in which the sensing target body F is close to the sensing surface is detected. In this respect, on the basis of a timing of the application of the driving signal Sg and a timing of the detection of the detector DET, the touch position coordinates thereof can be obtained.

As the touch sensor TS is operated as described above, reduction in sensor voltage and deterioration in image quality due to switching of the electrode driving can be prevented.

FIG. 13 is a schematic diagram illustrating a state at the time when the touch sensor TS is driven, according to the first embodiment of the invention, in which FIG. 13A illustrates a case where the sensing target body F is not close to the sensing surface of the touch sensor TS; and FIG. 13B illustrates a case where the sensing target body F is close to the sensing surface.

As shown in FIG. 13, the detection electrode 24 is formed with a slit KK in a surface thereof which faces the opposite electrode 23.

As shown in FIG. 13A, in the case where the sensing target body F is not close to the sensing surface (display surface) of the touch sensor TS, when the common electric potential Vcom is applied to the opposite electrode 23, an electric field is generated between the opposite electrode 23 and the detection electrode 24. In this embodiment, in addition to the electric field between the opposite electrode 23 and the detection electrode 24, a fringe electric field is generated through the slit KK which is installed in the detection electrode 24.

On the other hand, in the case where the sensing target body F is close to the sensing surface (display surface), as shown in FIG. 13B, the fringe electric field (dotted lines in the figure) is cut off by the sensing target body F. In this embodiment, the fringe electric field through the slit KK which is installed in the detection electrode 24 is cut off and is not generated.

Thus, in the case where the slit KK is formed in the detection electrode 24, the electrostatic capacitance is significantly varied according to the presence or absence of the sensing target body F, compared with a case where the slit KK is not formed.

Accordingly, in this embodiment, as the slit KK is formed in the detection electrode 24, the detection sensitivity of the touch sensor TS can be improved. Further, as a total width of a section other than the section where the slit KK is formed in the detection electrode 24 is maintained in the detection electrode 24, even though the entire width of the detection electrode 24 is increased, a resistance value can be maintained, and thus, a time constant can be prevented from being increased in the detection electrode 24. Thus, the detection time can be prevented from being increased. In addition, it is preferable to further increase the width of the slit KK.

Figure 14:
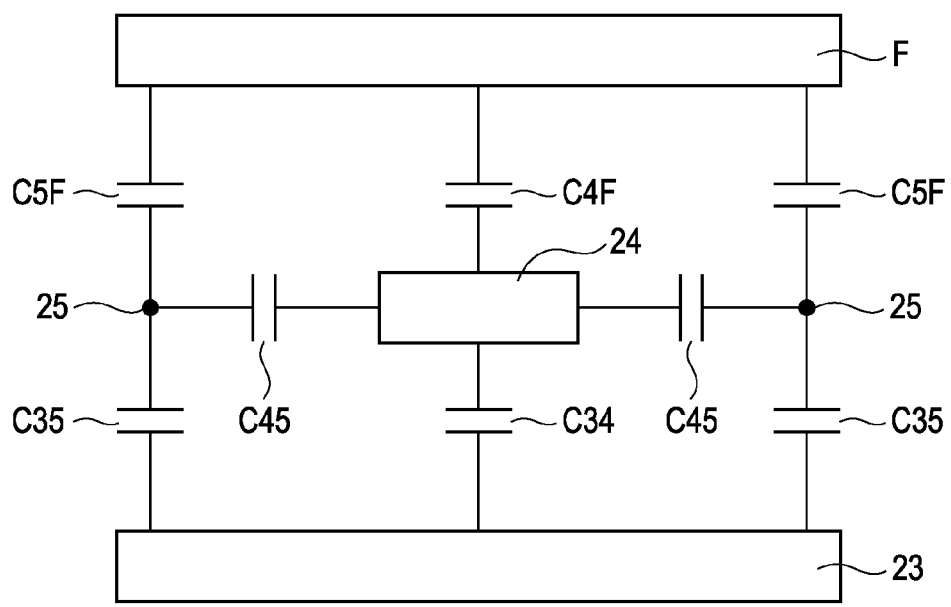
FIG. 14 is a diagram illustrating an equivalent circuit which is configured in a case where a sensing target body is close to a sensing surface when an electrostatic capacitance touch sensor TS is driven, according to the first embodiment of the invention.

FIG. 14 is a diagram illustrating an equivalent circuit which is configured in a case where the sensing target body F is close to the sensing surface when the electrostatic capacitance touch sensor TS is driven, according to the first embodiment of the invention.

As shown in FIG. 14, in the case where the sensing target body F is close to the sensing surface, electrostatic capacitances C34, C35, C45, C4F and C5F are generated between the opposite electrode 23, the detection electrode 24, the floating electrode 25 and the sensing target body F. The fringe capacitance C45 which is generated between the detection electrode 24 and the floating electrode 25 significantly contributes to the sensor sensitivity of the touch sensor TS. The fringe capacitance C45 includes capacitance due to an electric field which is generated between side surfaces of the detection electrode 24 and the floating electrode 25, and capacitance due to an electric field which is generated between upper surfaces, lower surfaces or the like of the detection electrode 24 and the floating electrode 25.

Figure 15:
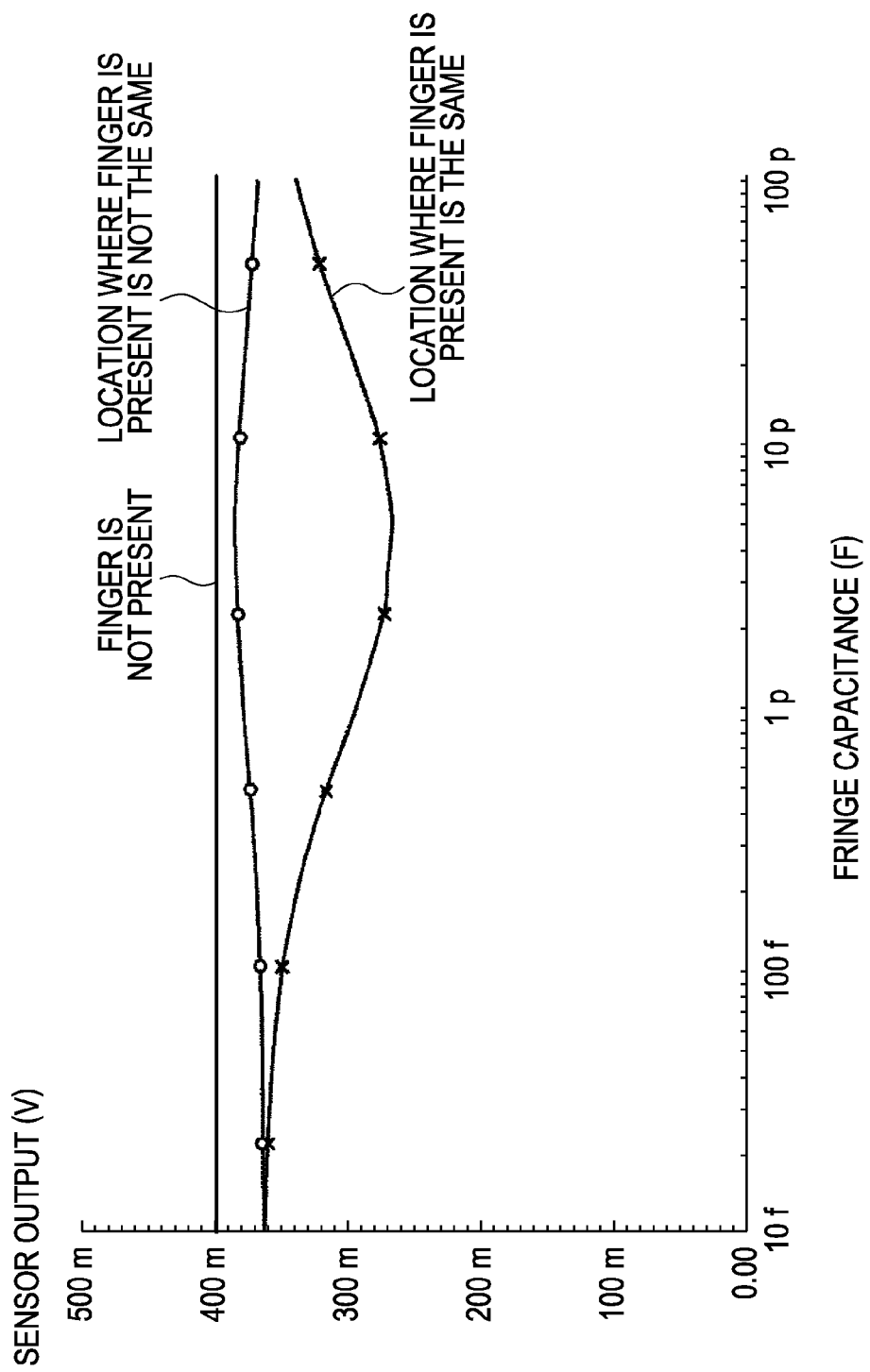
FIG. 15 is a diagram illustrating a simulation result with respect to a relationship between fringe capacitance and a sensor output according to the first embodiment of the invention.

FIG. 15 is a diagram illustrating a simulation result with respect to a relationship between the fringe capacitance and the sensor output according to the first embodiment of the invention. In FIG. 15, the transverse axis represents the fringe capacitance C45 (F) and the longitudinal axis represents the intensity (V) (sensor output) of the detection signal which is output from the detection signal 24. In FIG. 15, cases such as 'finger is not present', 'location where finger is present is not the same' or 'location where finger is present is the same' will be described.

Here, the 'finger is not present' represents a case where the finger which is the sensing target body F is not close to the sensing surface. That is, FIG. 14 illustrates a state where the sensing target body F is not present, and capacitance other than the capacitances C34, C35, and C45 is not generated.

Further, the 'location where finger is present is not the same' represents a case where the finger which is the sensing target body F is close to the sensing surface is positioned in a location of the plurality of opposite electrodes 23 where the driving signal Sg is not applied (see FIG. 14), that is, a case where the finger moves onto the detection electrode 24, but the opposite electrode 23 which is positioned under the detection electrode 24 does not become the common electric potential.

Further, the 'location where finger is present is the same' represents a case where the finger which is the sensing target body F is close to the sensing surface is positioned in a location of the plurality of opposite electrodes 23 where the driving signal Sg is applied (see FIG. 14), that is, a case where the finger moves onto the detection electrode 24, and the opposite electrode 23 which is positioned under the detection electrode 24 becomes the common electric potential.

The above simulations have been performed under the following conditions.

The capacitances C34, C35, C4F and C5F are 1 pF.

The electric potential of the driving signal Sg is 5V.

The number of the opposite electrodes 23 which intersects with the detection electrode 24 is ten (which is suitable for the size of a finger).

As shown in FIG. 15, as the fringe capacitance C45 is increased, a sensor output value in the case of the 'location where finger is present is not the same' and a sensor output value in the case of the 'location where finger is present is the same' can be significantly changed.

In this embodiment, as shown in FIG. 7, the floating electrode 25 is installed inside each slit KK of the detection electrode 24. As shown in FIG. 7, at least part of the floating electrode 25 is surrounded by the detection electrode 24. Thus, the fringe capacitance C45 between the detection electrode 24 and the floating electrode 25 can be increased (for example, C45=1 pF).

Accordingly, in this embodiment, the sensitivity of the touch sensor TS can be enhanced.

If the fringe capacitance is excessively increased, as shown in FIG. 14, the detection electrode 24 and the floating electrode 25 become the same as a connection state, thereby resulting in the same appearance as a case where a thick sensor line is present. Further, the capacitance C45 in FIG. 14 has preferably the same level as the other capacitances C4F, C5F, C434 and C35.

E. Conclusion

As described above, in the display device 100 according to the present embodiment, in the display surface of the liquid crystal display panel 200 on which images are displayed, the electrostatic capacitance touch sensor TS for detecting the position in which the sensing target body F is close to the display surface is installed (see FIG. 3). The touch sensor TS includes the opposite electrode 23 and the detection electrode 24, in which the detection electrode 24 faces and is spaced from the opposite electrode 23 through the dielectric body, and the electrostatic capacitance thereof is varied when the sensing target body F is close to the detection electrode 24. Here, the detection electrode 24 has the slit KK in the surface thereof which faces the opposite electrode 23. Thus, as described above, the touch sensor TS according to the present embodiment can significantly change the electrostatic capacitance according to the presence or absence of the sensing target body F, compared with a case where the slit KK is not formed in the detection electrode 24.

Further, in this embodiment, the floating electrode 25 is installed inside the slit KK of the detection electrode 24. Thus, as described above, in this embodiment, the fringe capacitance which significantly contributes to the sensor sensitivity of the touch sensor TS can be increased.

Accordingly, in this embodiment, the detection sensitivity of the touch sensor can be improved, and the detection of the touch sensor position of the sensing target body F can be performed with high accuracy.

In addition, in this embodiment, the plurality of opposite electrodes 23 serves as the scanning electrodes which face the plurality of detection electrodes 24 with the dielectric body being disposed in the touch sensor TS. Further, in the pixels P for image display, the plurality of opposite electrodes 23 serves as the common electrodes which face the plurality of pixel electrodes 62*p*, through the liquid crystal layer 203. Thus, the common driving signal Vcom for image display can be used as the driving signal for position detection to obtain the detection signal of the touch sensor TS. That is, the opposite electrode 23 is configured to serve as the common electrode for applying voltage to the liquid crystal layer 203 for image display, and the scanning electrode for forming the touch sensor TS. Further, since a separate touch panel is not externally provided, a thin configuration can be obtained.

Thus, according to the present embodiment, a thin device can be achieved, manufacturing efficiency can be enhanced, and the cost can be reduced.

2. Second Embodiment

Hereinafter, a second embodiment according to the invention will be described.

A. Detailed Configuration of Liquid Crystal Display Panel

A detailed configuration of the liquid crystal display 200*b* according to the embodiment will be described.

Figure 16:
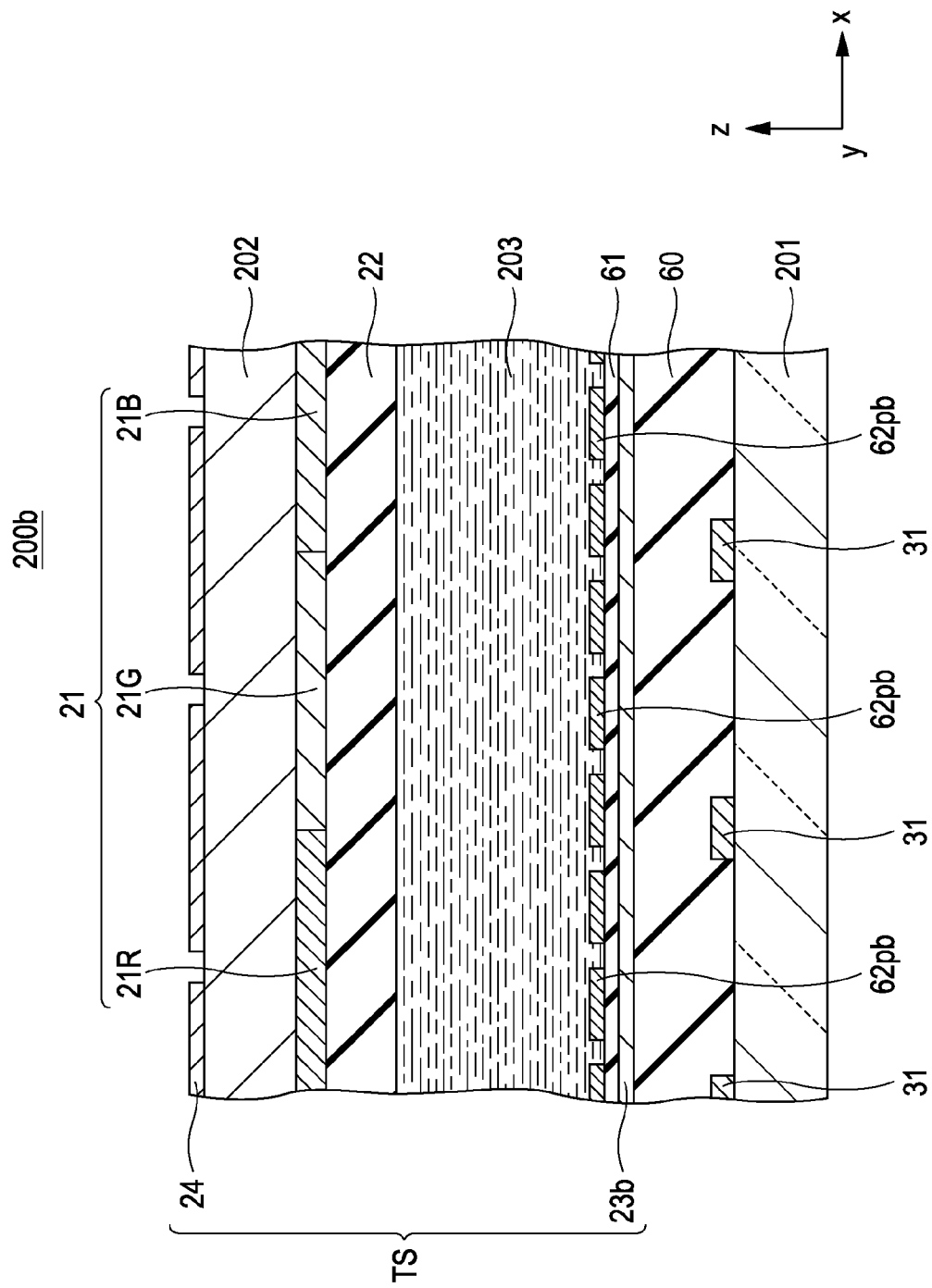
FIG. 16 is a diagram illustrating main parts of a liquid crystal display panel according to a second embodiment of the invention.
Figure 17:
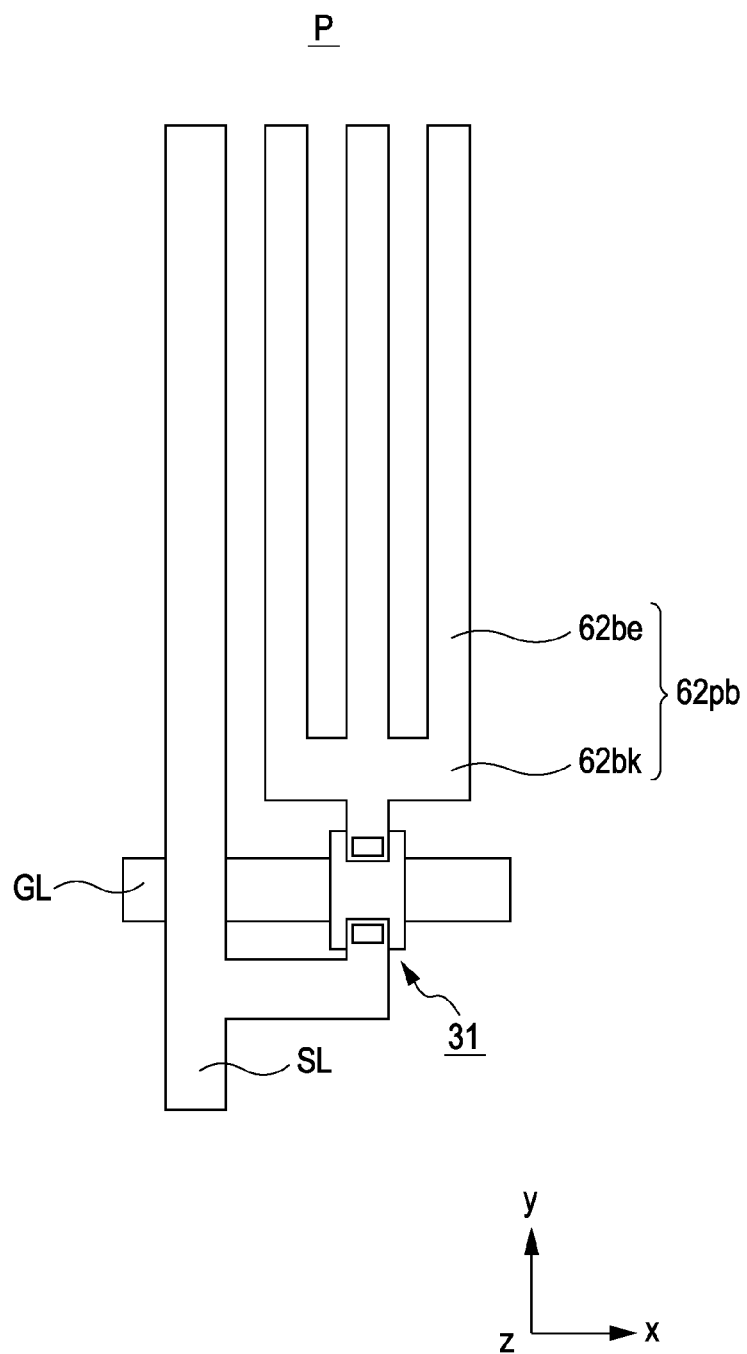
FIG. 17 is a diagram illustrating main parts of the liquid crystal display panel 200b according to the second embodiment of the invention.

FIGS. 16 and 17 are diagrams illustrating main parts of the liquid crystal display panel 200*b* according to the second embodiment of the invention.

Here, FIG. 16 is a schematic sectional view illustrating pixels P which are installed in a display area PA of the liquid crystal display panel 200*b* according to the second embodiment of the invention.

Further, FIG. 17 is a schematic top view illustrating the pixels P which are installed in the display area PA of the liquid crystal display panel 200*b* according to the second embodiment of the invention.

As shown in FIGS. 16 and 17, the liquid crystal display panel 200*b* in this embodiment is provided with a pixel electrode 62*pb* and an opposite electrode 23*b* to correspond to an FFS (Fringe Field Switching) method. Here, the second embodiment is the same as the first embodiment except insofar as these elements and a configuration are concerned. Thus, description of repetitive elements will be omitted.

As shown in FIG. 16, the pixel electrode 62pb is formed on a surface of a TFT array substrate 201 which faces an opposite electrode 202.

In this respect, as shown in FIG. 16, the pixel electrode 62pb is installed on an interlayer insulating layer 61 which is formed of an insulating material so as to cover the opposite electrode 23b in the TFT array substrate 201. For example, the pixel electrode 62pb is installed on the interlayer insulating layer 61 which is formed as a silicon nitride film.

In this embodiment, since the liquid crystal display panel 200b uses the FFS method, as shown in FIG. 17, the pixel electrode 62pb is pattern-processed in a pectinate shape in an x-y surface.

Specifically, as shown in FIG. 17, the pixel electrode 62pb includes a body section 62bk and a branch section 62be.

In the pixel electrode 62pb, as shown in FIG. 17, the body section 62bk extends in a direction x.

Further, in the pixel electrode 62pb, as shown in FIG. 17, the branch section 62be is connected to the body section 62bk and extends in a direction y. As shown in FIG. 17, the plurality of the branch sections 62be is arranged to be spaced from each other in the direction x. Further, the plurality of branch sections 62be has opposite parts which are connected to the body section 62bk and is aligned to be extended in parallel with each other.

As shown in FIG. 16, the opposite electrode 23b is formed on the surface of the TFT array substrate 201 which faces the opposite substrate 202. In this respect, the opposite electrode 23b is installed on the interlayer insulating film 61 which is formed on the TFT array substrate 201.

Figure 18:
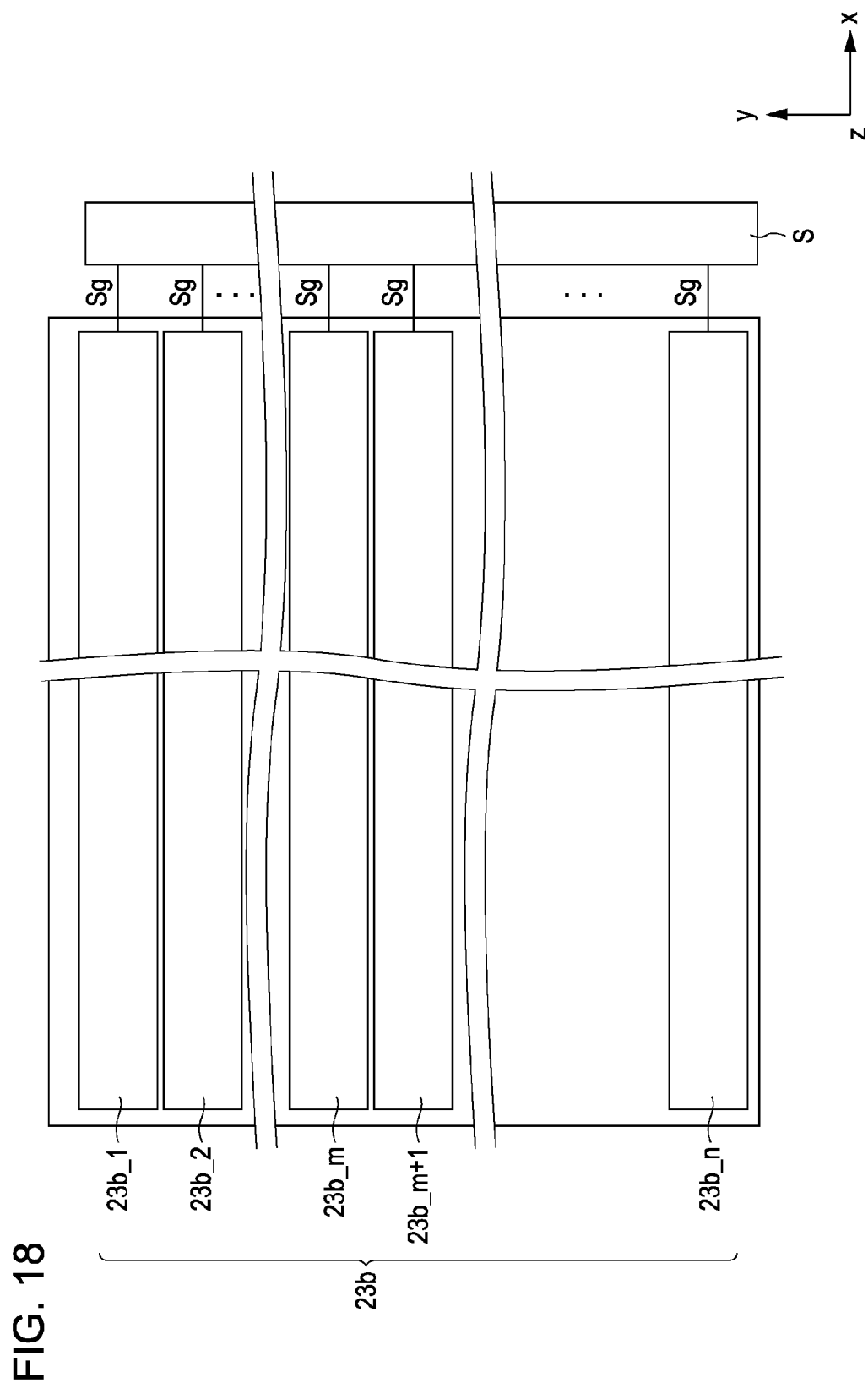
FIG. 18 is a diagram illustrating a detailed configuration of an opposite electrode 23b according to the second embodiment of the invention.

FIG. 18 is a diagram illustrating a detailed configuration of the opposite electrode 23b according to the second embodiment of the invention, which is a top view of the opposite electrode 23b.

As shown in FIG. 18, the opposite electrode 23b is a stripe shape and extends in the horizontal direction x, in a similar way to the first embodiment. The opposite electrodes 23b are aligned to be spaced from each other in the vertical direction y. That is, n items of opposite electrodes of a first to an n-th opposite electrodes 23b_1 to 23b_n are installed from the upside to the downside, as the opposite electrodes 23b. Here, the plurality of opposite electrodes 23b is installed with an equivalent interval respectively to face a plurality of pixel electrodes 62p which is aligned in the vertical direction y.

As shown in FIG. 18, the first to the n-th opposite electrodes 23b_1 to 23b_n are electrically connected to a sensor driving unit S, respectively, in a similar way to the first embodiment. The first to the n-th opposite electrodes 23b_1 to 23b_n are sequentially selected and are supplied with a driving signal Sg which is output from the sensor driving unit S. That is, the first to the n-th opposite electrodes 23b_1 to 23b_n are supplied with the driving signal Sg by means of line sequential scanning driving.

Further, a liquid crystal layer 203 (not shown) is aligned so that a lengthwise direction of liquid crystal molecules follows a direction of the x-y surface in which the TFT array substrate 201 faces the opposite substrate 202. That is, the liquid crystal molecules are formed to be horizontally aligned.

In the display device 100, when image display is performed, a transverse electric field is applied to the liquid crystal layer 203 by means of the pixel electrode 62p and the opposite electrode 23b. Thus, the alignment of the liquid crystal molecules of the liquid crystal layer 203 is changed, and thus, light which passes through the liquid crystal layer 203 is modulated.

In addition, an operation of detecting a position in which a sensing target body F such as a finger of a user is in contact with the display area PA of the liquid crystal display panel 200b is performed in a similar way to the first embodiment.

B. Conclusion

As described above, the liquid crystal display panel 200b in this embodiment uses the FFS type, and the transverse electric field is applied to the liquid crystal layer 203, and thus, the image display is performed. Further, as described above, the detection operation of the touch position is performed in a similar way to the first embodiment.

In this embodiment, the detection electrode 24 is configured in a similar way to the first embodiment. That is, the detection electrode 24 has a slit KK which is formed on the surface which faces the opposite electrode 23b. Thus, in a similar way to the first embodiment, the detection sensitivity of the touch sensor TS can be enhanced, and the detection of the touch position of the sensing target body can be performed with high accuracy.

In addition, in this embodiment, in a similar way to the first embodiment, a floating electrode 25 is installed inside the slit KK of the detection electrode 24. Thus, in this embodiment, fringe capacitance which significantly contributes to the sensor sensitivity of the touch sensor TS can be increased.

Accordingly, according to this embodiment, the detection of the touch position of the sensing target can be performed with high accuracy.

Similarly, in a mode in which the transverse electric field is applied to the liquid crystal layer 203, such as an IPS (In-Plane-Switching) method other than the FFS method, the same effect can be achieved with the same configuration.

3. Third Embodiment

Hereinafter, a third embodiment according to the invention will be described.

Figure 19:
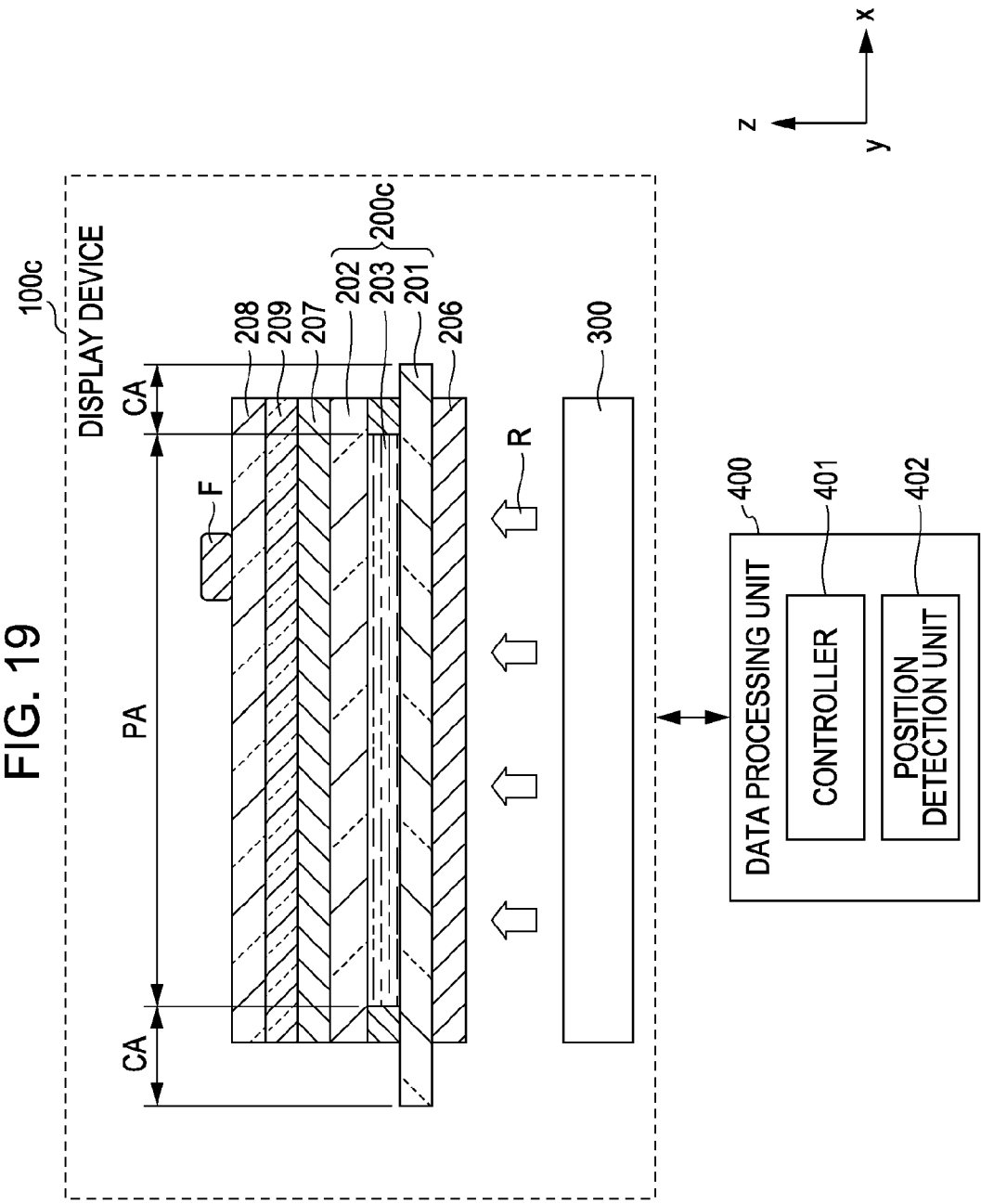
FIG. 19 is a diagram illustrating a schematic configuration of a display device according to a third embodiment of the invention.

FIG. 19 is a diagram illustrating a schematic configuration of a display device 100c according to a third embodiment of the invention.

As shown in FIG. 19, the display device 100c according to this embodiment has a liquid crystal display panel 200c which is different from the first embodiment. Further, a touch panel 209 is further arranged on the liquid crystal display panel 200c. Here, the third embodiment is the same as the first embodiment except insofar as these elements and a configuration are concerned. Thus, description of repetitive elements will be omitted.

A. Configuration of Liquid Crystal Display Panel

A configuration of the liquid crystal display panel 200c will be described.

Figure 20:
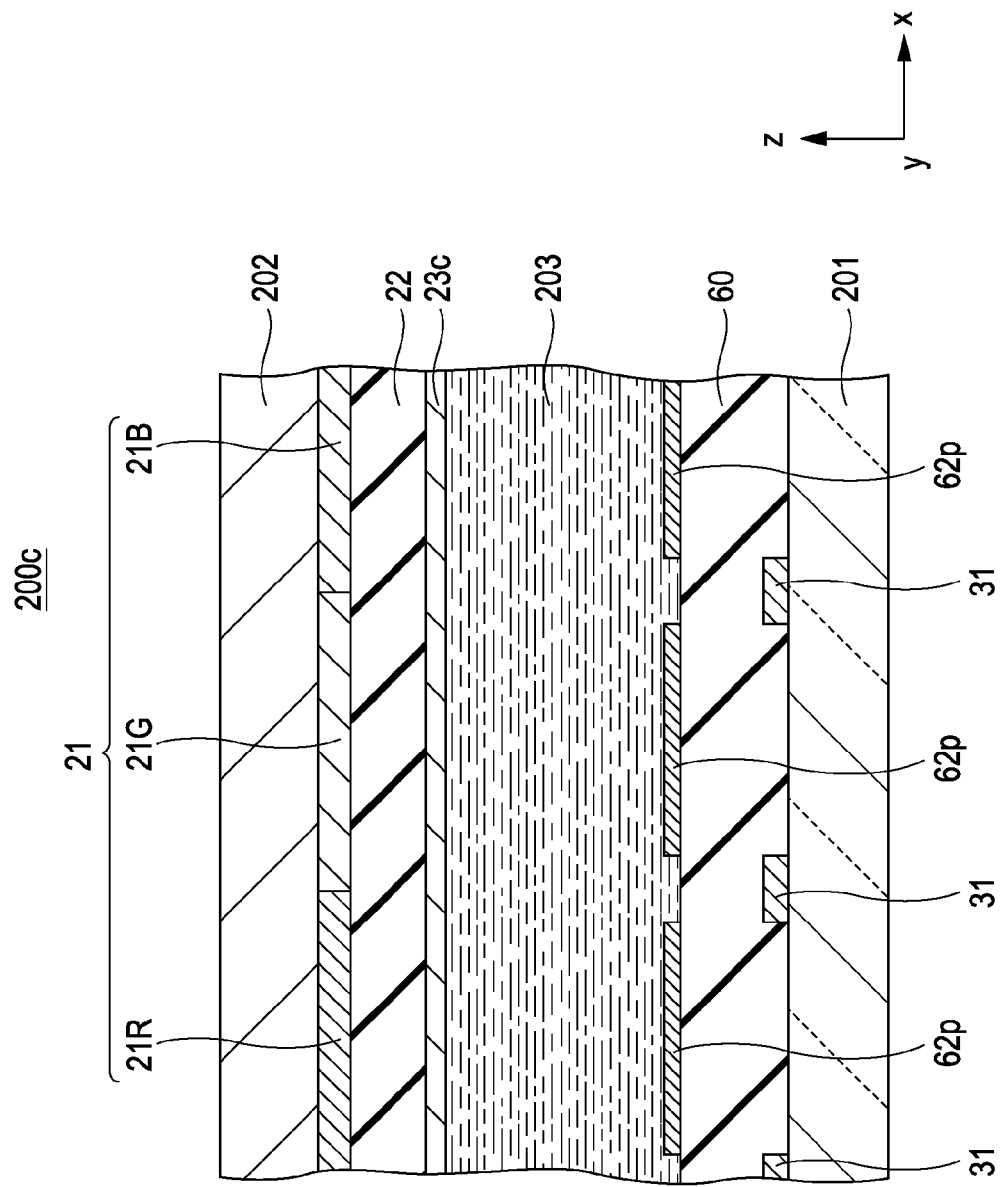
FIG. 20 is a diagram illustrating a configuration of a liquid crystal display device according to the third embodiment of the invention.

FIG. 20 is a diagram illustrating a configuration of the liquid crystal display device 200c according to the third embodiment of the invention, which is a schematic sectional view of pixels P.

As shown in FIG. 20, a touch sensor TS is not installed in the liquid crystal display panel 200c, differently from the first embodiment.

Thus, a detection electrode 24 (see FIG. 3) which forms the touch sensor TS is not installed in an opposite substrate 202 which forms the liquid crystal display panel 200c.

Further, an opposite electrode 23c is not provided as a plurality of separated opposite electrodes as in the first embodiment. Although not shown, in this embodiment, the opposite electrode 23c is formed in a solid manner on a planarization layer 22 so as to integrally cover the entire surface of a display area PA in which a plurality of pixel electrodes 62p is arranged. Further, the opposite electrode 23c is supplied with a common electric potential Vcom when image display is performed.

B. Configuration of Touch Panel

A configuration of the touch panel 209 will be described.

Figure 21:
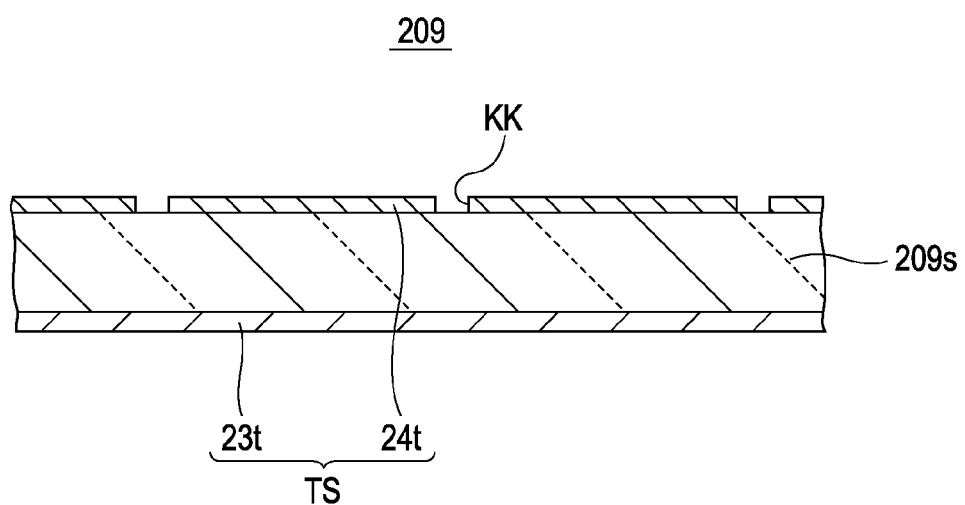
FIG. 21 is a diagram illustrating a configuration of a touch panel according to the third embodiment of the invention.

FIG. 21 is a diagram illustrating a configuration of a touch panel 209 according to the third embodiment of the invention, which illustrates a schematic sectional view of the touch panel 209.

As shown in FIG. 21, the touch panel 209 includes a touch panel substrate 209s.

In the touch panel 209, the touch panel substrate 209s is an insulating substrate which transmits light, and is formed, for example, of glass. Further, as shown in FIG. 21, a touch sensor TS is installed in the touch panel substrate 209s.

As shown in FIG. 21, the touch sensor TS is provided with an opposite electrode 23t and a detection electrode 24t, with the touch panel sensor 209s which is a dielectric body being disposed therebetween, and forms the touch panel 209 of an electrostatic capacitance type. That is, the touch sensor TS is configured so that the electrostatic capacitance is varied when a sensing target body (not shown) is close to the detection electrode 24t.

As shown in FIG. 21, in the touch sensor TS, the opposite electrode 23t is formed on a lower surface of the touch panel substrate 209s. The opposite electrode 23t is a transparent electrode which transmits visible light in a similar way to the first embodiment, and is formed, for example, of ITO.

Figure 22:
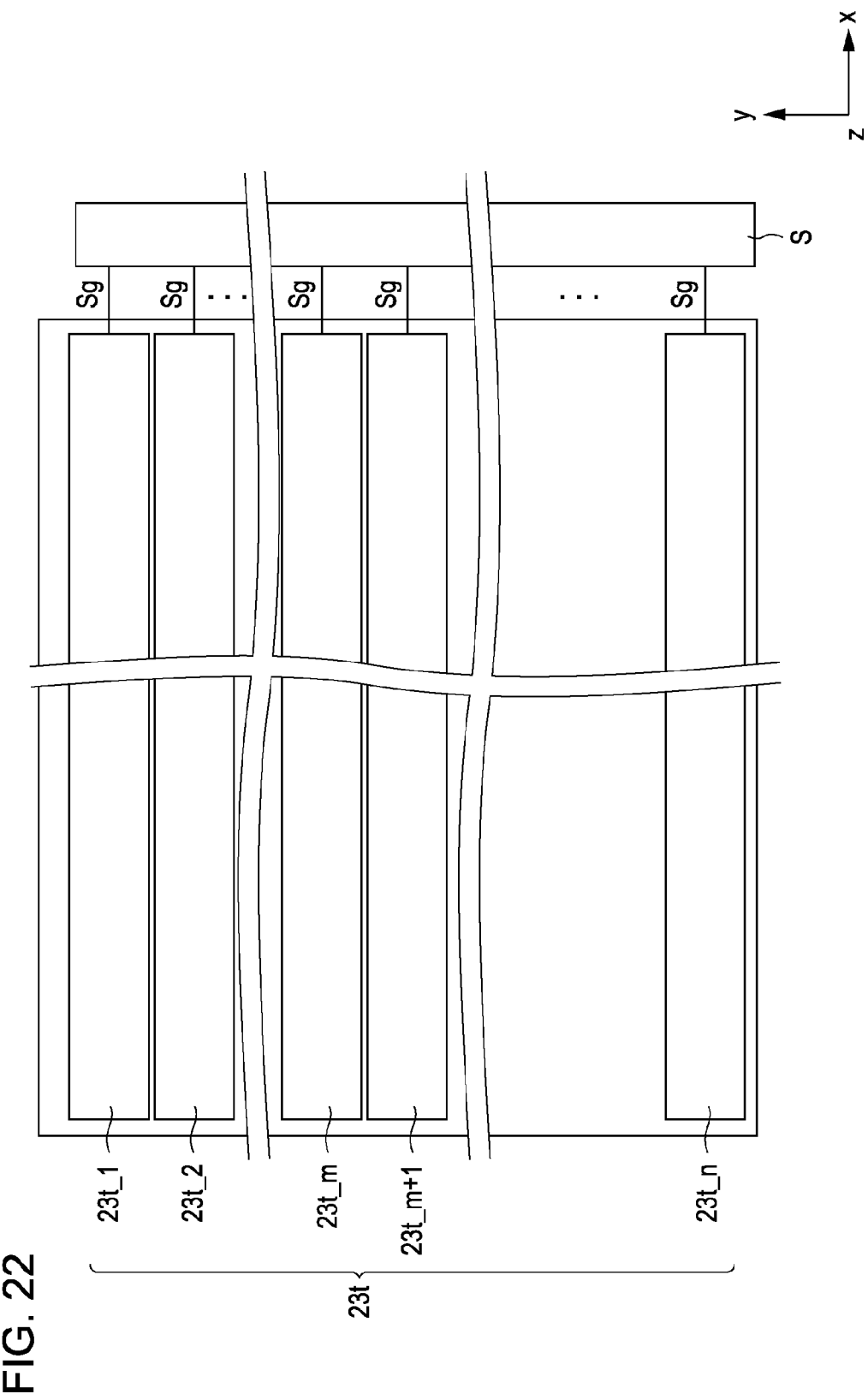
FIG. 22 is a diagram illustrating a detailed configuration of an opposite electrode according to the third embodiment of the invention.

FIG. 22 is a diagram illustrating a detailed configuration of the opposite electrode 23t according to the third embodiment of the invention, which is a top view of the opposite electrode 23t.

As shown in FIG. 22, the opposite electrode 23t is a stripe shape and extends in a horizontal direction x, in a surface of the touch panel substrate 209s, in a similar way to the first embodiment. The plurality of opposite electrodes 23t is aligned to be spaced from each other in a vertical direction y. That is, n items of opposite electrodes of a first to an n-th opposite electrodes 23t_1 to 23t_n are installed from the upside to the downside, as the opposite electrodes 23t.

As shown in FIG. 22, the first to the n-th opposite electrodes 23t_1 to 23t_n are electrically connected to a sensor driving unit S, respectively, in a similar way to the first embodiment. The first to the n-th opposite electrodes 23t_1 to 23t_n are sequentially selected and are supplied with a driving signal Sg which is output from the sensor driving unit S. That is, the first to the n-th opposite electrodes 23t_1 to 23t_n each are supplied with the driving signal Sg by means of line sequential scanning driving. In this respect, in a similar way to the first embodiment, the driving signal Sg of a common electric potential Vcom is supplied thereto.

In the touch sensor TS, as shown in FIG. 21, the detection electrode 24t is formed on an upper surface of the touch panel substrate 209s. The detection electrode 24t is a transparent electrode which transmits visible light, and is formed, for example, of ITO.

Figure 23:
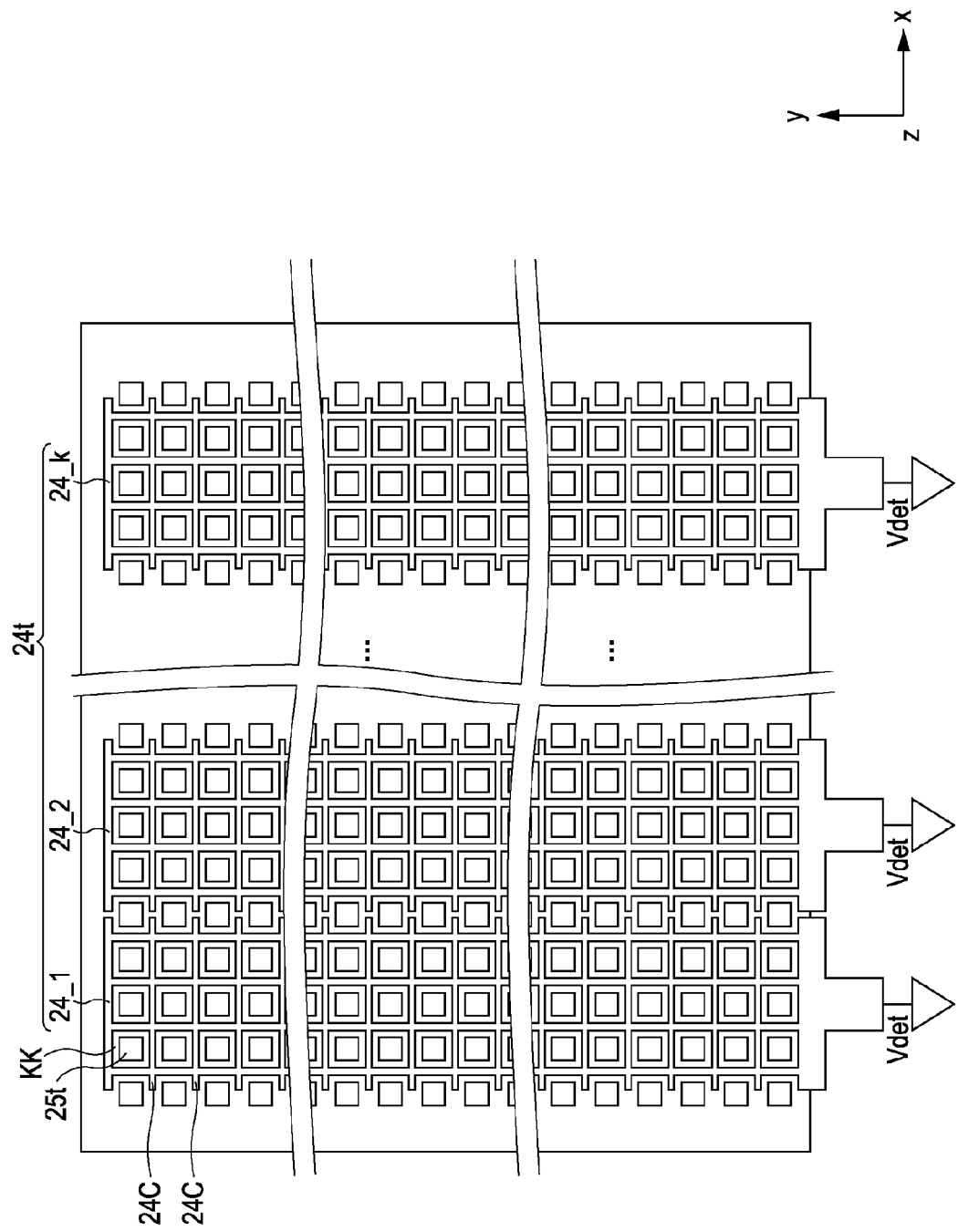
FIG. 23 is a diagram illustrating a detailed configuration of a detection electrode according to the third embodiment of the invention.

FIG. 23 is a diagram illustrating a detailed configuration of the detection electrode 24t according to the third embodiment of the invention, which is a top view of the detection electrode 24t.

As shown in FIG. 23, the detection electrode 24t is a stripe shape and extends in the vertical direction y, in the surface of the touch panel substrate 209s, in a similar way to the first embodiment. The plurality of opposite electrodes 24t is aligned to be spaced from each other in the horizontal direction x. That is, k items of opposite electrodes of a first to a k-th opposite electrodes 24t_1 to 24t_k are installed from the left side to the right side, as the detection electrodes 24t.

As shown in FIG. 23, the first to the k-th detection electrodes 24t_1 to 24t_k are electrically connected to a detector DET, respectively, and a detection signal Vdet is output to the detector DET.

Further, as shown in FIG. 23, each of the detection electrodes 24t has a slit KK on a surface thereof which faces the opposite electrode 23t, in a similar way to the first embodiment.

As shown in FIG. 23, a floating electrode 25t is installed inside the slit KK, in a similar way to the first embodiment. In this respect, the plurality of floating electrodes 25t is aligned to correspond to the plurality of slits KK, respectively, in the horizontal direction x and the vertical direction y.

In the touch panel 209 in this embodiment, the touch sensor TS is driven, and thus, the detection of the touch position is performed, in a similar way to the first embodiment.

Specifically, a part of the plurality of opposite electrodes 23t is selected and is supplied with the driving signal Sg. Further, the plurality of opposite electrodes 23t is shifted in the vertical direction y for selection, and is supplied with the driving signal Sg in a similar way. The operation is repeatedly performed, and thus, the detection of the touch position is performed.

C. Conclusion

As described above, in the touch panel 209 in this embodiment, the detection operation of the touch position is performed in a similar way to the first embodiment.

In this embodiment, the detection electrode 24t has the slit KK on the surface thereof which faces the opposite electrode 23t. Thus, in a similar way to the first embodiment, the detection sensitivity of the touch sensor TS can be enhanced, and the detection of the touch position of the sensing target body can be performed with high accuracy.

Further, in this embodiment, in a similar way to the first embodiment, the floating electrode 25t is installed inside the slit KK of the detection electrode 24t. Thus, in this embodiment, the fringe capacitance which significantly contributes to the sensor sensitivity of the touch sensor TS can be increased.

According to the present invention, the detection of the touch position of the sensing target body can be performed with high accuracy.

4. Fourth Embodiment

Hereinafter, a fourth embodiment according to the invention will be described.

Figure 24:
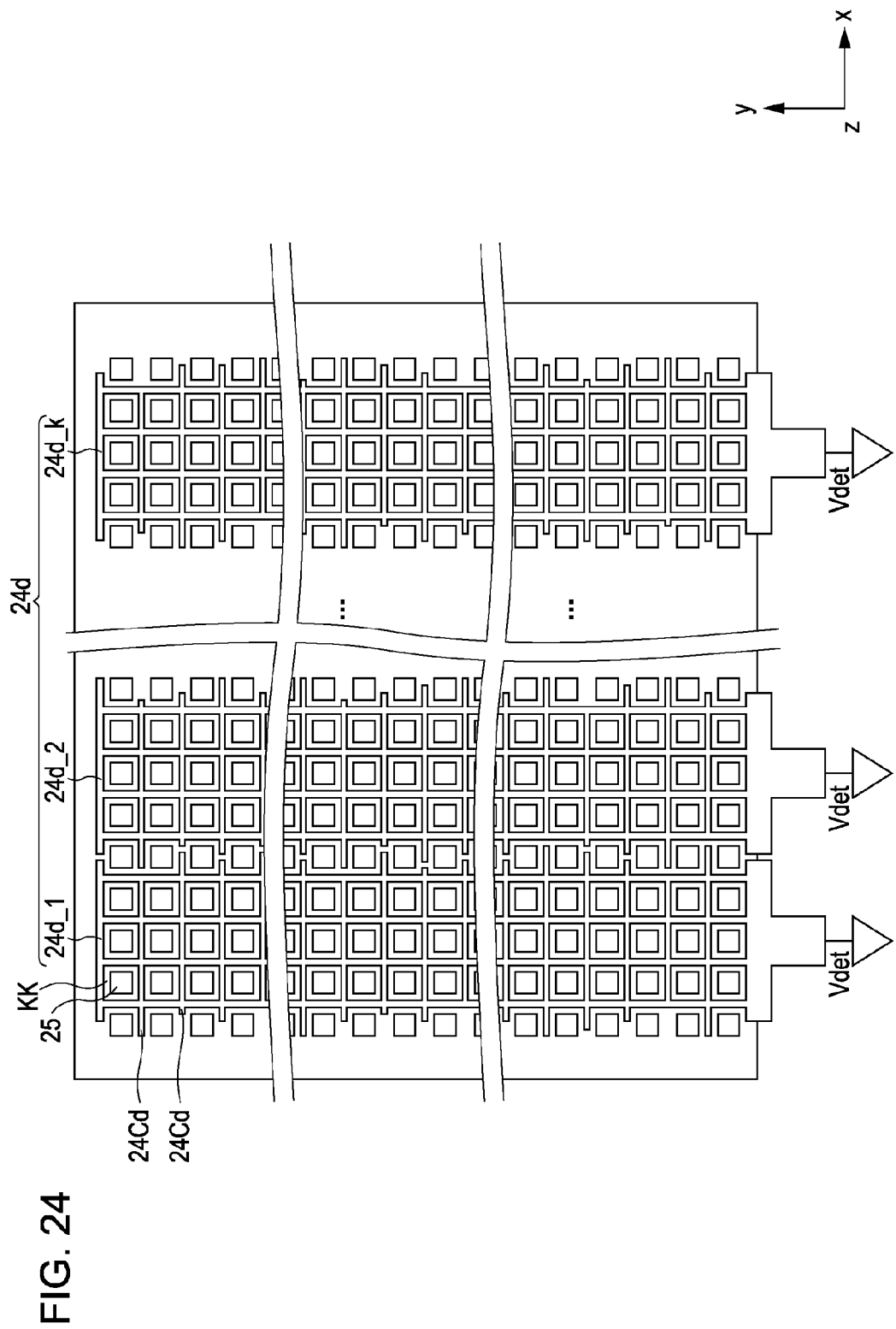
FIG. 24 is a diagram illustrating a detailed configuration of a detection electrode according to a fourth embodiment of the invention.

FIG. 24 is a diagram illustrating a detailed configuration of a detection electrode 24d according to a fourth embodiment of the invention, which is a top view of the detection electrode 24d.

As shown in FIG. 24, in this embodiment, the detection electrode 24d is different from that of the first embodiment. Here, the fourth embodiment is the same as the first embodiment except insofar as these elements and a configuration are concerned. Thus, description of repetitive elements will be omitted.

A. Detection Electrode

As shown in FIG. 24, the plurality of detection electrodes 24d is arranged to be aligned in a horizontal direction x. That is, k items of detection electrodes of a first to a k-th opposite electrodes 24d_1 to 24d_k are installed from the left side to the right side, as the detection electrodes 24d.

As shown in FIG. 24, in the detection electrode 24d, a plurality of protrusion sections 24Cd which is arranged in a vertical direction y is formed so that positions of end parts thereof in the horizontal direction x become random in the vertical direction y, differently from the first embodiment.

B. Conclusion

As described above, in this embodiment, the plurality of protrusion sections 24Cd is formed so that the positions of the end parts in the horizontal direction x become random in the vertical direction y. That is, the end parts of the detection electrode 24d are not in a straight line, but are positioned in different locations.

Thus, in this embodiment, it is difficult to visualize the detection electrode 24d.

Thus, according to this embodiment, the image quality of images which are displayed on the sensing surface can be further enhanced.

5. Fifth Embodiment

Hereinafter, a fifth embodiment according to the invention will be described.

Figure 25:
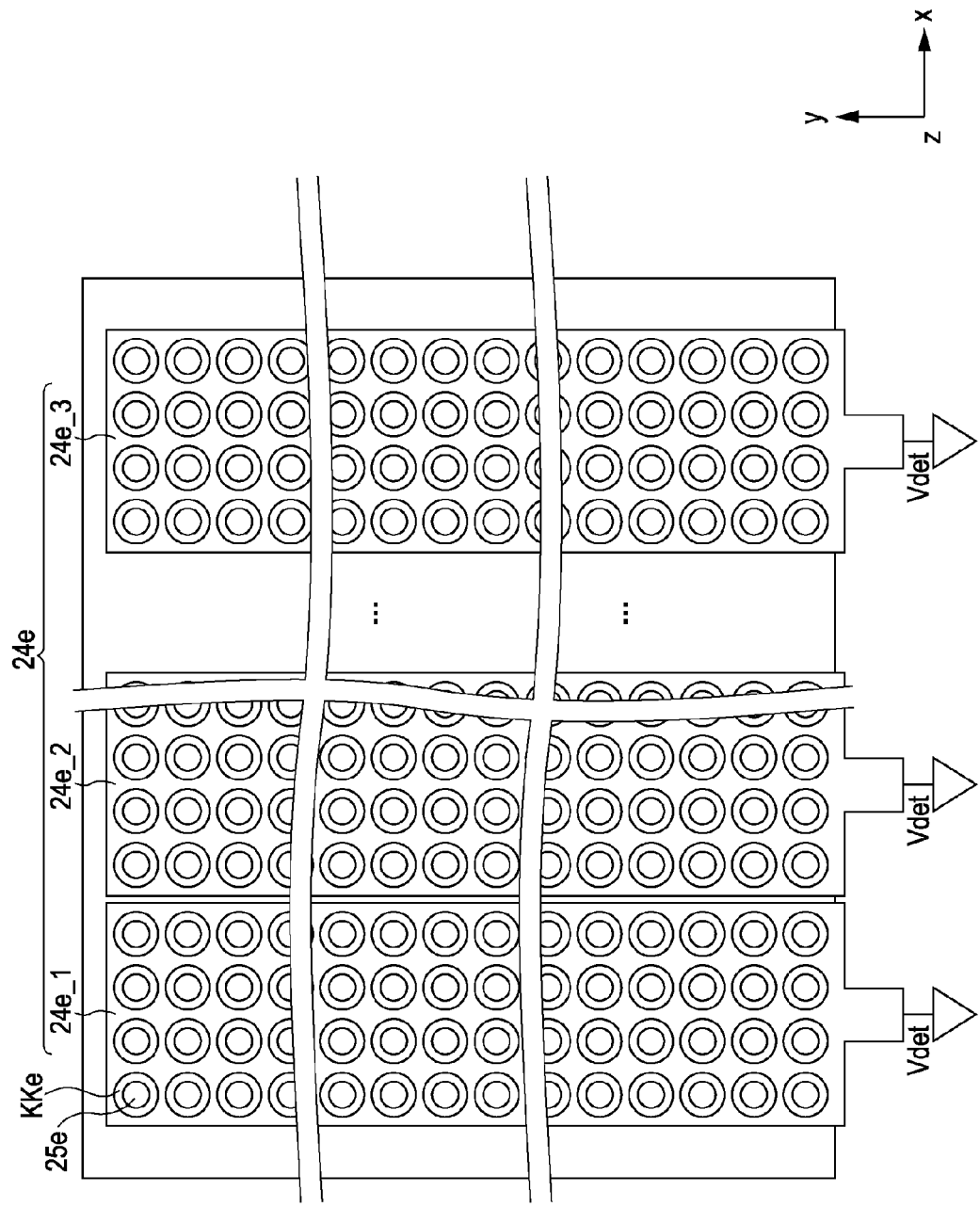
FIG. 25 is a diagram illustrating a detailed configuration of a detection electrode according to a fifth embodiment of the invention.

FIG. 25 is a diagram illustrating a detailed configuration of a detection electrode 24e according to a fifth embodiment of the invention, which is a top view of the detection electrode 24e.

As shown in FIG. 25, in this embodiment, the detection electrode 24e is different from that of the first embodiment. Here, the fifth embodiment is the same as the first embodiment except insofar as these elements and a configuration are concerned. Thus, description of repetitive elements will be omitted.

A. Detection Electrode

As shown in FIG. 25, the detection electrode 24e is a stripe shape and extends in a vertical direction y. Further, the plurality of detection electrodes 24e is aligned to be spaced from each other in a horizontal direction x. That is, k items of detection electrodes of a first to a k-th detection electrodes 24e_1 to 24e_k are installed from the left side to the right side, as the detection electrodes 24e.

The detection electrode 24e is formed with a slit KKe. The slit KKe is formed to have a circular shape inside the detection electrode 24e. The plurality of detection electrodes 24e is installed to be spaced from each other in the vertical direction y and the horizontal direction x.

As shown in FIG. 25, a floating electrode 25e is installed inside each slit KKe. In this respect, the plurality of floating electrodes 25e is installed to be aligned in the horizontal direction x and the vertical direction y to correspond to the plurality of slits KKe, respectively. The floating electrode 25e has a circular shape and is formed to be smaller in diameter than the slit KKe.

B. Conclusion

As described above, the detection electrode 24e is formed with the circular slit KKe. Thus, a fringe electric field is further uniformly generated between an opposite electrode 23 and the detection electrode 24e.

Thus, according to the present embodiment, the detection of the touch position of a sensing target body can be performed with high accuracy.

6. Sixth Embodiment

Hereinafter, a sixth embodiment according to the invention will be described.

Figure 26:
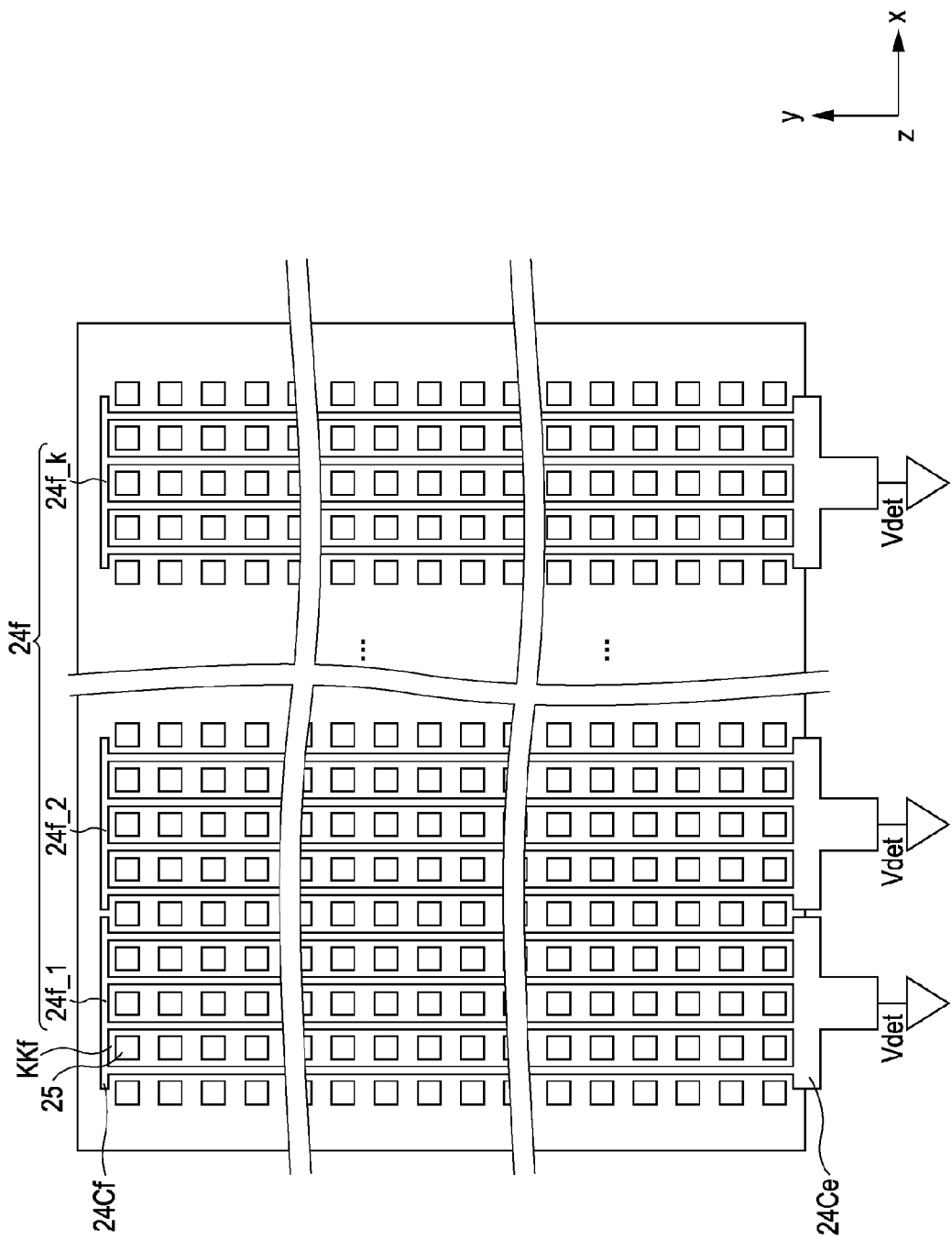
FIG. 26 is a diagram illustrating a detailed configuration of a detection electrode according to a sixth embodiment of the invention.

FIG. 26 is a diagram illustrating a detailed configuration of a detection electrode 24f according to a sixth embodiment of the invention, which is a top view of the detection electrode 24f.

As shown in FIG. 26, in this embodiment, the detection electrode 24f is different from that of the first embodiment. Here, the sixth embodiment is the same as the first embodiment except insofar as these elements and a configuration are concerned. Thus, description of repetitive elements will be omitted.

A. Detection Electrode

As shown in FIG. 26, the detection electrode 24f generally extends in a vertical direction y. Further, the plurality of detection electrodes 24f is aligned to be spaced from each other in a horizontal direction x. That is, k items of detection electrodes of a first to a k-th detection electrodes 24f_1 to 24f_k are installed from the left side to the right side, as the detection electrodes 24f.

As shown in FIG. 26, the detection electrode 24f is formed with a slit KKf. The slit KKf is formed to have a stripe shape inside the detection electrode 24d, and extends in the vertical direction y. The plurality of slits KKf is aligned to be spaced from each other in the horizontal direction x in the detection electrode 24f.

As shown in FIG. 26, the detection electrode 24f is formed with a protrusion section 24Cf in an end part which extends in the vertical direction y. The protrusion section 24Cf protrudes in the horizontal direction x. The protrusion sections 24Cf are installed to be spaced from each other in the vertical direction y. In this respect, the plurality of protrusion sections 24Cf is installed so that one slit KKf is disposed between the adjacent protrusion sections 24Cf in the vertical direction y.

As shown in FIG. 26, a floating electrode 25f is installed inside each slit KKf. In this respect, the floating electrode 25f is formed to have a square shape. Further, the plurality of floating electrodes 25f is installed to be aligned in the vertical direction y inside one slit KKe.

B. Conclusion

As described above, in this embodiment, the detection electrode 24f is different in shape from that of the first embodiment, but the slit KKf is formed in a similar way to the first embodiment. Thus, in a similar way to the first embodiment, in this embodiment, electrostatic capacitance can be significantly varied according to the presence or absence of a sensing target body F, in the touch sensor.

Further, in the present embodiment, the floating electrode 25f is installed inside the slit KKf of the detection electrode 24f. Thus, in this embodiment, in a similar way to the first embodiment, fringe capacitance which significantly contributes to the sensor sensitivity of the touch sensor can be increased.

Thus, in the present embodiment, the detection sensitivity of the touch sensor can be enhanced, and the detection of the touch position of the sensing target body F can be performed with high accuracy.

7. Others

The present invention is not limited to the above embodiments, but can adopt a variety of modification examples such as a combination of the respective embodiments.

For example, a variety of shapes can be applied as the shape of the slit which is installed in the detection electrode and the shape of the floating electrode, other than the above embodiments.

FIG. 27 is a diagram illustrating a detailed configuration of a detection electrode according to a modified embodiment of the invention, which is a top view of the detection electrode.

As shown in FIG. 27A, in rectangular slits KK, end parts in a vertical direction y may be positioned in different locations in a horizontal direction x.

As shown in FIG. 27B, hexagonal slits KK may be arranged in a honey comb shape. Further, a hexagonal floating electrode 25, which is similar to the shape of the slit KK, may be formed inside the slit KK.

Further, as shown in FIG. 27C, triangular slits KK may be arranged to be alternately inverted in the horizontal direction x, and the group of the equilateral-triangular slits KK may be arranged to be sequentially symmetric in the vertical direction y. Further, the triangular shaped floating electrode 25, which is similar to the shape of the slit KK, may be formed arranged inside the slit KK.

Further, as shown in FIG. 27D, slits KK of a diamond shape may be arranged in the vertical direction y and the horizontal direction x. Thus, the floating electrode 25 of a diamond shape, which is similar to the shape of the slit KK, may be formed inside the slit KK.

In the above embodiments, when the touch sensor is driven, an operation for alternating-current-driving the opposite electrode is repeatedly performed while being shifted in the vertical direction along which the plurality (n items) of opposite electrodes is aligned. In this alternating current driving operation, the plurality (m items (m<n)) of opposite electrodes which is continuously aligned is selected and is alternating-current-driven at the same time. In this respect, the plurality (m items (m<n)) of opposite electrodes is selected so that an opposite electrode used for performing a pixel driving operation is included therein. In performing the continuous alternating current driving operations, the shift is performed so that at least one opposite electrode is continuously alternating-current-driven. However, when the touch sensor is driven, the above described operation is not limitative. For example, the alternating current driving may be performed for every opposite electrode for operation.

In the above embodiments, the touch sensor is provided in the display area of the liquid crystal display panel, but the invention is not limited thereto. The touch sensor may be provided in the circumferential area of the liquid crystal display panel.

In the above embodiments, the liquid crystal display panel is a transmission type, but the invention is not limited thereto. The liquid crystal display panel may be a reflective type, or a semi-transmission type which can be used as the transmission type and the reflection type.

Further, the invention may be applied to a display panel other than the liquid crystal display panel, such as an organic EL display.

In addition, the display device 100 according to the present embodiments can be applied to a component of a variety of electronic devices.

FIGS. 28 to 32 are diagrams illustrating electronic devices to which the display device 100 according to the embodiment of the invention is applied.

Figure 28:
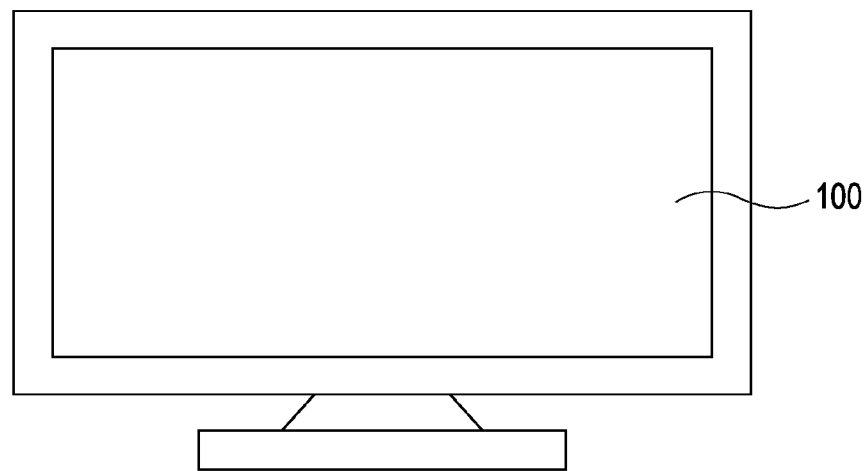
FIG. 28 is a diagram illustrating an electronic device to which a display device according to an embodiment of the invention is applied.

As shown in FIG. 28, in a television which receives and displays television broadcasting, the display device 100 can be applied as a display device which displays received images on a display screen and receives a manipulation command of an operator.

Figure 29:
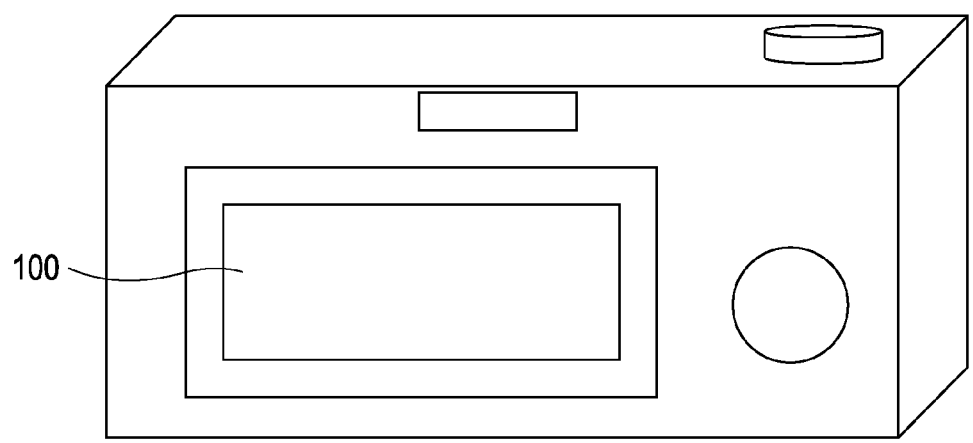
FIG. 29 is a diagram illustrating an electronic device to which a display device according to an embodiment of the invention is applied.

Further, as shown in FIG. 29, in a digital still camera, the display device 100 can be applied as a display device which displays images such as photographed images on a display screen and receives a manipulation command of an operator.

Figure 30:
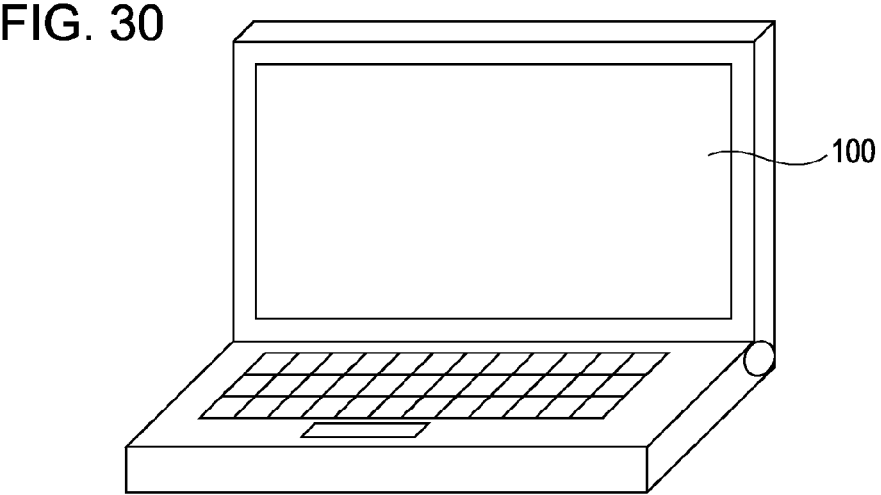
FIG. 30 is a diagram illustrating an electronic device to which a display device according to an embodiment of the invention is applied.

In addition, as shown in FIG. 30, in a notebook type personal computer, the display device 100 can be applied as a display device which displays images such as manipulation images on a display screen and receives a manipulation command of an operator.

Figure 31:
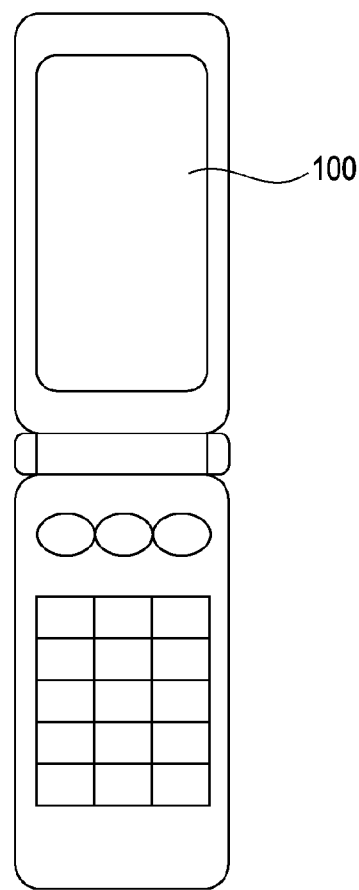
FIG. 31 is a diagram illustrating an electronic device to which a display device according to an embodiment of the invention is applied.

Moreover, as shown in FIG. 31, in a mobile phone terminal, the display device 100 can be applied as a display device which displays images such as manipulation images on a display screen and receives a manipulation command of an operator.

Figure 32:
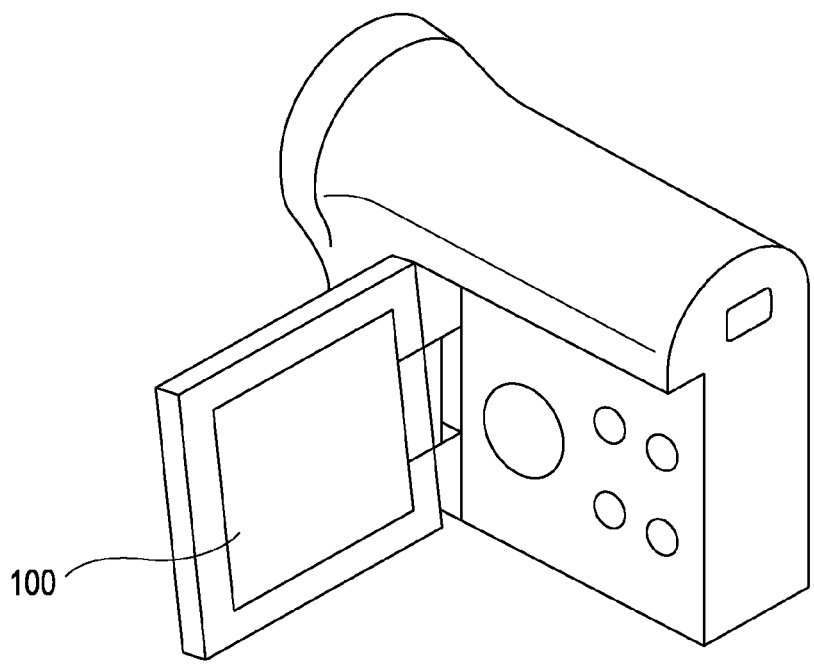
FIG. 32 is a diagram illustrating an electronic device to which a display device according to an embodiment of the invention is applied.

As shown in FIG. 32, in a video camera, the display device 100 can be applied as a display device which displays images such as manipulation images on a display screen and receives a manipulation command of an operator.

In the above embodiments, the opposite electrodes 23, 23b, 23c and 23t correspond to the scanning electrode and the common electrode of the present invention. Further, in the above embodiments, the detection electrodes 24, 24d, 24e, 24f and 24t correspond to the detection electrode of the present invention. In addition, in the above embodiments, the protrusion sections 24C, 24Cd and 24Cf correspond to the protrusion section of the present invention. Moreover, in the above embodiments, the floating electrodes 25, 25e, 25f and 25t correspond to the floating electrode of the present invention. Further, in the above embodiment, the pixel electrodes 62p and 62pb correspond to the pixel electrode of the present invention. Furthermore, in the above embodiments, the display devices 100 and 100c correspond to the display device and the information input device of the present invention. In addition, in the above embodiments, the liquid crystal display panels 200, 200b, 200c correspond to the display panel of the present invention. Further, in the above embodiments, the TFT array substrate 201 corresponds to the second substrate of the invention. In the above embodiments, the opposite substrate 202 corresponds to the first substrate of the invention. Still further, in the above embodiments, the liquid crystal layer 203 corresponds to the liquid crystal layer of the invention. Further, in the above embodiments, the touch panel 209 corresponds to the touch panel of the invention. In addition, in the above embodiments, the slits KK, KKe and KKf correspond to the slit of the invention. Further, in the above embodiments, the touch sensor TS corresponds to the touch sensor of the invention.

The present application contains subject matter related to that disclosed in Japanese Priority Patent Application JP 2009-154072 filed in the Japan Patent Office on Jun. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information input device comprising a touch panel which is provided with a touch sensor capable of sensing a position in which a sensing target body is close to a sensing surface thereof, wherein:

the touch sensor includes (a) scanning electrodes each of which extends in a first direction, (b) detection electrodes each of which extends in a second direction perpendicular to the first direction, the detection electrodes facing and spaced from the scanning electrodes, the detection electrodes arranged in one plane, the scanning electrodes arranged in another plane and (c) a dielectric body interposed between the scanning and detection electrodes;

each detection electrode is formed with a plurality of apertures contained therewithin, each aperture overlapping a scanning electrode;

a plurality of floating electrodes are within a same plane as the detection electrodes and each is contained within a respective aperture;

each scan electrode extends longitudinally farther in the first direction than laterally in the second direction;

each detection electrode extends longitudinally farther in the second direction than laterally in the first direction; and electrostatic capacitance between each detection electrode and one of the floating electrodes within one of the apertures of the detection electrode varies when the sensing target body is close to the detection electrode.

2. The information input device according to claim 1, wherein the detection electrodes and the floating electrodes are transparent electrodes which transmit visible light.

3. The information input device according to claim 1, wherein each aperture is a slit.

4. The information input device according to claim 1 wherein:

each detection electrode includes a protrusion section that protrudes in the first direction from a side edge which extends in the second direction, and the protrusion sections are spaced from each other in the second direction.

5. The information input device according to claim 4, wherein the plurality of protrusion sections are formed so that end parts of the plurality of protrusion sections in the first direction are positioned in a random way.

6. The information input device according to claim 1, wherein each aperture has a circular shape.

7. The information input device according to claim 1, further comprising a controller which selects a specific scanning electrode among the plurality of scanning electrodes and repeatedly performs a touch sensor driving operation for supplying a driving signal to the selected scanning electrode to drive the touch sensor, wherein the controller selects, when performing the touch sensor driving operation, the plurality (m items) of the scanning electrodes which is continuously aligned in the second direction among the plurality (n items, 2<m<n) of scanning electrodes, as a scanning electrode group, and shifts the scanning electrode group in the second direction for the selection so that the different scanning electrode and the common scanning electrode are included between the continuous touch sensor driving operations.

8. The information input device according to claim 1, wherein each aperture has a rectangular shape.

9. The information input device according to claim 1, wherein each aperture has a square shape.

10. The information input device according to claim 1, wherein:

each detection electrode has a stripe shape that extends in the first direction, the plurality of detection electrodes are arranged in a stripe pattern, each scanning electrode has a stripe shape that extends in the second direction, and the plurality of the scanning electrodes are arranged in a stripe pattern.

11. A display device comprising a display panel which is provided with a touch sensor capable of sensing a position, where a sensing target body is close, in a display surface on which an image is displayed, wherein:

the touch sensor includes (a) scanning electrodes each of which extends in a first direction, (b) detection electrodes each of which extends in a second direction perpendicular to the first direction, the detection electrodes facing and spaced from the scanning electrodes, the detection electrodes arranged in one plane, the scanning electrodes arranged in another plane and (c) a dielectric body interposed between the scanning and detection electrodes;

each detection electrode is formed with a plurality of apertures contained therewithin, each aperture overlapping a scanning electrode;

a plurality of floating electrodes are within a same plane as the detection electrodes and each is contained within a respective aperture;

each scan electrode extends longitudinally farther in the first direction than laterally in the second direction;

each detection electrode extends longitudinally farther in the second direction than laterally in the first direction; and electrostatic capacitance between each detection electrode and one of the floating electrodes within one of the apertures of the detection electrode varies when the sensing target body is close to the detection electrode.

12. The display device according to claim 11, wherein the display panel is a liquid crystal display panel, the liquid crystal display panel including:

a first substrate;

a second substrate which faces and is spaced from the first substrate; and a liquid crystal layer which is disposed between the first substrate and the second substrate.

13. The display device according to claim 12, wherein:

the detection electrodes are on a surface of the first substrate which is opposite to a surface of the first substrate which faces the second substrate, and the scanning electrodes are between the first substrate and the second substrate facing the detection with the first substrate being disposed therebetween.

14. The display device according to claim 11, wherein the display panel includes a plurality of pixels which are aligned in a display area, wherein the plurality of scanning electrodes are used as a common electrode and are spaced from the plurality of pixels in the display area, wherein the plurality of scanning electrodes is commonly used as the common electrode.

15. An information input device comprising a touch panel which is provided with a touch sensor capable of sensing a position in which a sensing target body is close to a sensing surface thereof, wherein:

the touch sensor includes (a) scanning electrodes each of which extends in a first direction, (b) detection electrodes each of which extends in a second direction perpendicular to the first direction, the detection electrodes facing and spaced from the scanning electrodes, the detection electrodes arranged in one plane, the scanning electrodes arranged in another plane and (c) a dielectric body interposed between the scanning and detection electrodes;

each detection electrode is formed with a plurality of apertures contained therewithin, each aperture overlapping a scanning electrode;

a plurality of floating electrodes are within a same plane as the detection electrodes and each is contained within a respective aperture;

each scan electrode extends longitudinally farther in the first direction than laterally in the second direction;

each detection electrode extends longitudinally farther in the second direction than laterally in the first direction; and electrostatic capacitance between each detection electrode and one of the floating electrodes within one of the apertures of the detection electrode varies when the sensing target body is close to the detection electrode.

\* \* \* \* \*